(12) United States Patent
Banerjee

(10) Patent No.: US 8,566,578 B1
(45) Date of Patent: Oct. 22, 2013

(54) METHOD AND SYSTEM FOR ENSURING COMPLIANCE IN PUBLIC CLOUDS USING FINE-GRAINED DATA OWNERSHIP BASED ENCRYPTION

(75) Inventor: Deb Banerjee, Cupertino, CA (US)

(73) Assignee: Symantec Corporation, Mountain View, CA (US)

( * ) Notice: Subject to any disclaimer, the term of this patent is extended or adjusted under 35 U.S.C. 154(b) by 143 days.

(21) Appl. No.: 13/030,010

(22) Filed: Feb. 17, 2011

(51) Int. Cl.
*H04L 29/06* (2006.01)
*H04L 9/32* (2006.01)

(52) U.S. Cl.
USPC ............ 713/153; 713/150; 713/166; 713/168; 713/170; 713/171; 726/1; 726/3; 726/25; 726/26; 709/217

(58) Field of Classification Search
USPC ................. 713/153, 150, 166, 168, 170, 171; 726/1, 3, 25, 26; 709/217
See application file for complete search history.

(56) References Cited

U.S. PATENT DOCUMENTS

| | | | | |
|---|---|---|---|---|
| 2009/0300719 | A1* | 12/2009 | Ferris | 726/3 |
| 2010/0275263 | A1* | 10/2010 | Bennett et al. | 726/25 |
| 2010/0292556 | A1* | 11/2010 | Golden | 600/364 |
| 2010/0332401 | A1* | 12/2010 | Prahlad et al. | 705/80 |
| 2010/0332454 | A1* | 12/2010 | Prahlad et al. | 707/654 |
| 2010/0332456 | A1* | 12/2010 | Prahlad et al. | 707/664 |
| 2010/0332479 | A1* | 12/2010 | Prahlad et al. | 707/741 |
| 2010/0332818 | A1* | 12/2010 | Prahlad et al. | 713/150 |
| 2010/0333116 | A1* | 12/2010 | Prahlad et al. | 719/328 |
| 2011/0010339 | A1* | 1/2011 | Wipfel et al. | 707/610 |
| 2011/0106927 | A1* | 5/2011 | Carter et al. | 709/223 |
| 2011/0264906 | A1* | 10/2011 | Pourzandi et al. | 713/153 |
| 2011/0264907 | A1* | 10/2011 | Betz et al. | 713/153 |
| 2012/0110044 | A1* | 5/2012 | Nagpal et al. | 707/827 |

OTHER PUBLICATIONS

Web-Application Architecture for Regulatory Compliant Cloud Computing. Mar. 15, 2011. p. 1-8.*
Arshad Noor. Build a regulatory compliant web-application. Mar. 2, 2012. p. 1-16.*
Lee Badger et al. US Government Cloud Computing Technology Roadmap. Nov. 2011. NIST. p. 1-32.*

\* cited by examiner

*Primary Examiner* — Edan Orgad
*Assistant Examiner* — Kari Schmidt
(74) *Attorney, Agent, or Firm* — McKay and Hodgson, LLP; Serge J. Hodgson; Sean P. Lewis

(57) ABSTRACT

A method and system for ensuring compliance in public clouds using fine-grained encryption based on data ownership that includes a process for ensuring compliance in public clouds using fine-grained encryption based on data ownership that is implemented, at least in part, at a gateway computing system through which data passes from the enterprise, and/or one or more end users, prior to being sent to the public cloud. In one embodiment, the data is classified, the ownership of the data is determined, the associated encryption keys are obtained, and the data is encrypted, automatically at the gateway computing system before the data is transferred to the public cloud, and in a manner that is transparent to end-users.

17 Claims, 5 Drawing Sheets

METHOD AND SYSTEM FOR ENSURING COMPLIANCE IN PUBLIC CLOUDS USING FINE-GRAINED DATA OWNERSHIP BASED ENCRYPTION

BACKGROUND OF THE INVENTION

Currently there exist several security regulations and regulatory policies that are associated with regulating the access and use of certain types of "sensitive" data associated with individuals such as payment data, health related data, and various other types of financial and personal data. These security regulations and regulatory policies include, but are not limited to: the Payment Card Industry Data Security Standard (PCI DSS); the Health Insurance Portability and Accountability Act (HIPAA); and the Sarbanes-Oxley Act, among others. Many of these security regulations and regulatory policies require specific access protocols, technical controls, regular reporting, and audit trails, related to the accessing and transport of, use of, and processing of, various types of data.

The recent emergence of "cloud computing", including Software as a Service (SaaS) computing models, Platform as a Service (PaaS) computing models, and Infrastructure as a Service (IaaS) computing models, has created several challenges with respect to implementing and establishing compliance with existing regulatory policies. For instance, using "public clouds", an "enterprise", or business that processes sensitive data subject to regulatory policies and/or regulations, currently has little or no control of the data at the network, compute, and storage level at the provider. As a result, while still being required to comply with the regulatory policies, and prove that the data is being handled/processed in accordance with the regulatory policies and regulations, the enterprises often do not have the control of the data at the network, compute, and storage level necessary to deploy any technical controls, such as, firewalls, VA, configuration checks, and AV, that are widely used in the traditional on-premise data centers that were historically under the control of the enterprise. Consequently, while many enterprises want to adopt the public cloud as their computing model, they are hesitant because of their concerns about security and compliance with various security regulations and regulatory policies.

Encryption is a compensating control that is currently proposed to implement some security standards such as enforcing privacy. However, currently, the most efficient data encryption in public cloud computing environments takes place at the enterprise, or, at best, divisional or large group level through deployments at enterprise gateways such as e-mail and web traffic. As a result, currently, relatively few encryption keys are shared by multiple individuals accessing the encrypted data. Consequently, current systems do not typically comply with the principle of least privilege necessary to meet the requirements of several compliance regulations, for instance see PCI DSS Requirements: 7, 8, 10.

In order to meet the least privilege requirements, encryption keys must be assigned that are unique to a defined user, or, at most, a defined small group of users, that are legitimately charged with accessing and/or processing the data, i.e., that "own" the data. As a result, to meet the least privilege requirements, numerous encryption keys are required that are uniquely associated with individuals, or very small groups of individuals. This ensures that only a designated user, or small group of users, owning the data can access the data when it is stored in the public cloud as encrypted data. In addition, since the encryption key provides access to only a small portion of the data, if the encryption key is compromised, only a small defined sub-set of the data is potentially compromised.

Unfortunately, using current security data systems, generating and using numerous encryption keys that are uniquely associated with individuals, or very small groups of individuals, places a significant burden on the enterprise's agents, i.e., the individuals accessing and processing the data, each time the data is accessed and/or saved at the enterprise level, and or sent to the public cloud.

As a result of the situation described above, many enterprises that could benefit significantly from the use of a public cloud computing model currently do not employ public clouds because of their uncertainty regarding security and security compliance standards, and the inefficiency of involving their employees and/or agents in burdensome security compliance procedures. This is not only inefficient for the enterprises themselves, but is also ultimately inefficient for commerce and the end consumer.

SUMMARY

According to one embodiment, a method and system for ensuring compliance in public clouds using fine-grained encryption based on data ownership includes a process for ensuring compliance in public clouds using fine-grained encryption based on data ownership that is implemented, at least in part, at a gateway computing system through which data passes from the enterprise, and/or one or more end users, prior to being sent to the public cloud. In one embodiment, the data is classified, the ownership of the data is determined, the associated encryption keys are obtained, and the data is encrypted, automatically at the gateway computing system before the data is transferred to the public cloud, and in a manner that is transparent to end-users.

In one embodiment, the process for ensuring compliance in public clouds using fine-grained encryption based on data ownership discussed herein is implemented as part of a public cloud data backup system. In this instance, in one embodiment, data from enterprise data stores, i.e., an enterprise controlled data storage system, such as Sharepoint™, Exchange™, etc. is backed up to the public cloud through a gateway computing system that is in the form of a backup server computing system, or a similar device. In one embodiment, the data from the enterprise data store is sent to the backup server computing system and the backup server computing system then applies data classification to determine whether the data is in-compliance scope, i.e., is subject to one or more regulatory policies and/or regulations. In one embodiment, if the data is in-compliance scope, then the data owner is determined, in one embodiment automatically, using a data ownership determination system. In one embodiment, once the data ownership is determined, the encryption keys associated with the identified data owners are obtained, in one embodiment, from an enterprise encryption key management server system implemented by the enterprise. In one embodiment, the data is then encrypted using the respective encryption keys associated with the data owners. In one embodiment, the encrypted data is then backed up to the public cloud as ownership-based fine-grained encrypted data.

In one embodiment, the process for ensuring compliance in public clouds using fine-grained encryption based on data ownership discussed herein is implemented as part of an online document store used to store and share data on behalf of an enterprise, such as Google Docs™, Live Office™, etc. In this instance, in one embodiment, at a gateway computing system such as a web proxy computing system, or similar gateway computing system, a determination is made as to whether the data is in-compliance scope, i.e., is subject to one or more regulatory policies and/or regulations. In one embodiment, if the data is in-compliance scope, then the data owner is determined, in one embodiment automatically, using a data ownership determination system. In one embodiment, once the data ownership is determined, the encryption keys associated with the data owners are obtained, in one embodiment, from an enterprise encryption key management system. In one embodiment, the data is then encrypted using the respective encryption keys associated with the data owners. In one embodiment, the encrypted data is then sent to the public cloud as ownership-based fine-grained encrypted data.

Using the method and system for ensuring compliance in public clouds using fine-grained encryption based on data ownership discussed herein, the principle of least privilege necessary to meet the requirements of several compliance regulations is met by establishing data ownership, obtaining the relevant encryption keys based on the data ownership, and encrypting the data using the relevant encryption keys, automatically at a gateway computing system prior to data transfer to the public cloud. In this way, the encryption, and required level of security compliance, can be performed in a manner that is easily verified and is virtually effortless and transparent to the end user. Consequently, using the method and system for ensuring compliance in public clouds using fine-grained encryption based on data ownership discussed herein, enterprises can obtain the benefits of using a public cloud computing model while still meeting, and maintaining the ability to prove they are meeting, data security compliance regulations, and without placing any significant security related burden on their employees and/or agents.

Figure 1:
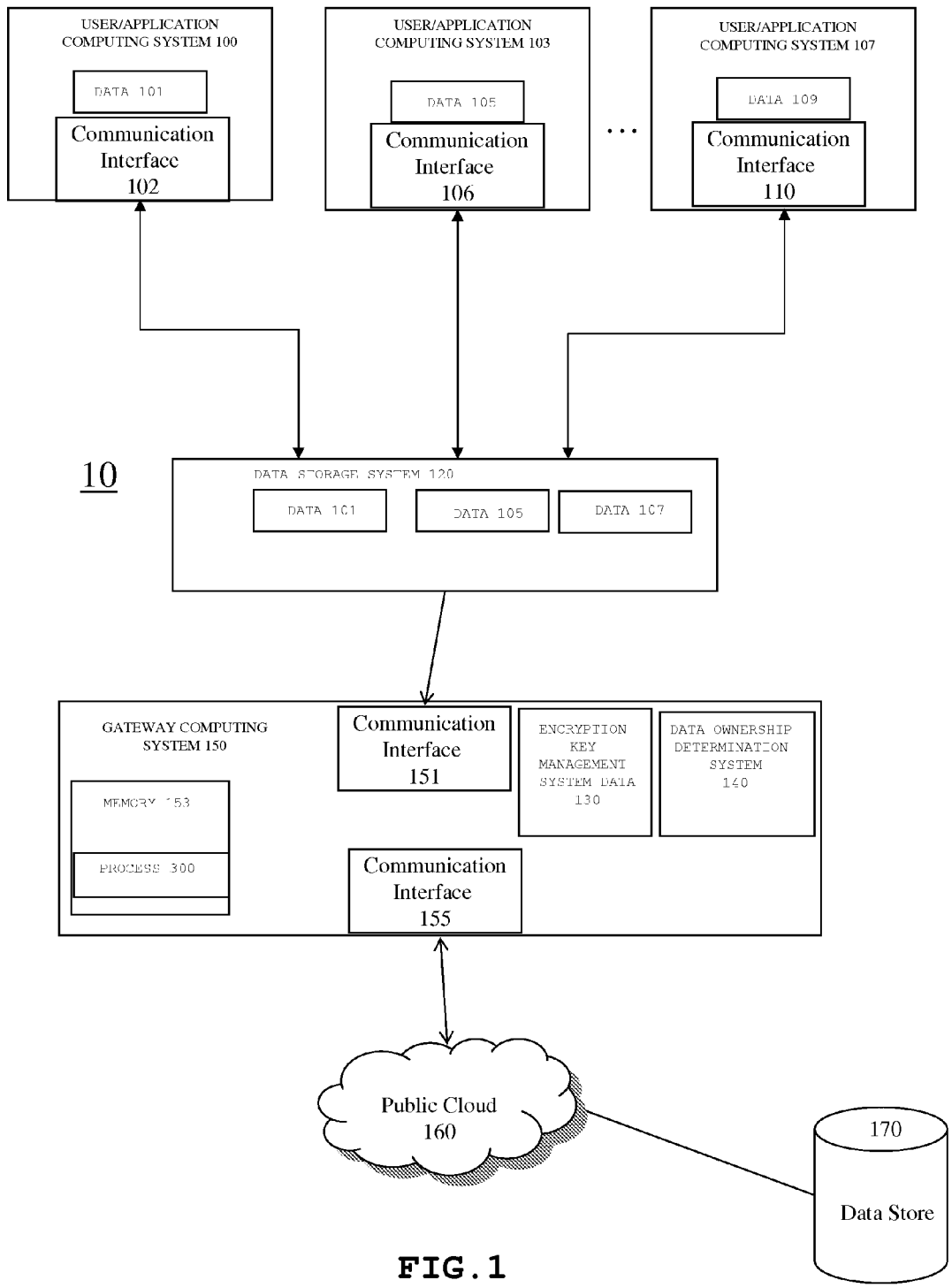
FIG. 1 is a block diagram of an exemplary hardware architecture for implementing one embodiment including user/application computing systems, a data storage system, a gateway computing system, a public cloud, and a public cloud-based data store in accordance with one embodiment.

Common reference numerals are used throughout the FIG.s and the detailed description to indicate like elements. One skilled in the art will readily recognize that the above FIG.s are examples and that other architectures, modes of operation, orders of operation and elements/functions can be provided and implemented without departing from the characteristics and features of the invention, as set forth in the claims.

DETAILED DESCRIPTION

Embodiments will now be discussed with reference to the accompanying FIG.s, which depict one or more exemplary embodiments. The following description includes reference to specific embodiments for illustrative purposes. However, the illustrative discussion below is not intended to be exhaustive or to limit the invention to the precise forms disclosed. Many modifications and variations are possible in view of the teachings below. The embodiments discussed below were chosen and described in order to explain the principles of the invention, and its practical applications, to thereby enable others skilled in the art to utilize the invention and various embodiments with various modifications as may be suited to the particular use contemplated. Therefore, embodiments may be embodied in many different forms than those shown and discussed herein and should not be construed as limited to the embodiments set forth herein, shown in the FIG.s, and/or described below.

In one embodiment, data entered, processed, created, and/or otherwise modified or accessed by an end user is transferred a gateway computing system through which all, or a significant portion, of data passes before being transferred to the public cloud.

In one embodiment, the data the gateway computing system then applies data classification to determine whether the data is in-compliance scope, i.e., is subject to one or more regulatory policies and/or regulations. In one embodiment, if the data is determined to not be subject to one or more regulatory policies and/or regulations, then the data is sent directly to the public cloud without further processing.

In one embodiment, if the data is in-compliance scope, then the data owner is determined. In one embodiment the data owner is determined automatically at the gateway computing system using a data ownership determination system. Data ownership determination systems use various parameters to determine the ownership of data without having to resort to obtaining input from the data owners themselves at the time of each data save or transfer. Consequently, using some data ownership determination systems, employees and/or agents of the enterprise that own the data are not disturbed as the data ownership determination takes place transparently from the data owners' perspective. One example of a data ownership determination system is Data Insight Technology™ available from Symantec Corporation of Mountain View, Calif.

In one embodiment, once the data ownership is determined, the encryption keys associated with the identified data owners are obtained. In one embodiment, the encryption keys associated with the identified data owners are obtained from an enterprise encryption key management server system implemented by the enterprise.

In one embodiment, the data is then encrypted using the respective encryption keys associated with the data owners.

In one embodiment, the encrypted data is then stored in the public cloud as ownership-based fine-grained encrypted data.

In one embodiment, the process for ensuring compliance in public clouds using fine-grained encryption based on data ownership discussed herein is implemented as part of a public cloud data backup system. In this instance, in one embodiment, data entered, processed, created, and/or otherwise modified or accessed by an end user is transferred to a enterprise data store, i.e., an enterprise controlled data storage system, such as Sharepoint™, Exchange™, etc.

In one embodiment, the data is then backed up to the public cloud through a gateway computing system that, in one embodiment, is a backup server computing system, or a similar device. In one embodiment, the data from the enterprise data store is sent to the backup server computing system and the backup server computing system then applies data classification to determine whether the data is in-compliance scope, i.e., is subject to one or more regulatory policies and/or regulations. In one embodiment, if the data is determined to not be subject to one or more regulatory policies and/or regulations, then the data is backed up directly to the public cloud without further processing.

In one embodiment, if the data is in-compliance scope, then the data owner is determined. In one embodiment, the data owner is determined automatically at the backup server using a data ownership determination system. Data ownership determination systems use various parameters to determine the ownership of data without having to resort to obtaining input from the data owners themselves at the time of each backup. Consequently, using some data ownership determination systems, employees and/or agents of the enterprise that own the data are not disturbed as the data ownership determination takes place transparently from the data owners' perspective. One example of a data ownership determination system is Data Insight Technology™ available from Symantec Corporation of Mountain View, Calif.

In one embodiment, once the data ownership is determined, the encryption keys associated with the identified data owners are obtained. In one embodiment, the encryption keys associated with the identified data owners are obtained from an enterprise encryption key management server system implemented by the enterprise.

In one embodiment, the data is then encrypted using the respective encryption keys associated with the data owners.

In one embodiment, the encrypted data is then stored in the public cloud as ownership-based fine-grained encrypted data.

In one embodiment, the process for ensuring compliance in public clouds using fine-grained encryption based on data ownership discussed herein is implemented as part of an online document store used to store and share data on behalf of an enterprise, such as Google Docs™, Live Office™, etc. In this instance, in one embodiment, at a gateway computing system such as a web proxy computing system, or similar gateway computing system, a determination is made as to whether the data is in-compliance scope, i.e., is subject to one or more regulatory policies and/or regulations. In one embodiment, if the data is determined to not be subject to one or more regulatory policies and/or regulations, then the data is sent directly to the public cloud without further processing.

In one embodiment, if the data is in-compliance scope, then the data owner is determined. In one embodiment the data owner is determined automatically at the web proxy computing system using a data ownership determination system. As noted above, data ownership determination systems use various parameters to determine the ownership of data without having to repeatedly resort to obtaining input from the data owners themselves. Consequently, using some data ownership determination systems, employees and/or agents of the enterprise that own the data are not disturbed and the data ownership determination takes place transparently from the data owners' perspective. One example of a data ownership determination system is Data Insight Technology™ available from Symantec Corporation of Mountain View, Calif.

In one embodiment, once the data ownership is determined, the encryption keys associated with the identified data owners are obtained. In one embodiment, the encryption keys associated with the identified data owners are obtained from an enterprise encryption key management server system implemented by the enterprise.

In one embodiment, the data is then encrypted using the respective encryption keys associated with the data owners.

In one embodiment, the encrypted data is then sent to the public cloud as ownership-based fine-grained encrypted data.

FIG. 1 shows a block diagram of an exemplary hardware system 10 suitable for implementing one embodiment of a process for ensuring compliance in public clouds using fine-grained encryption based on data ownership, such as exemplary process 300 of FIG. 3, discussed below. Returning to FIG. 1, exemplary hardware system 10 includes: one or more user/application computing systems 100, 103, and 107, including data 101, 105, and 109, and communication interfaces 102, 106, and 110; data storage system 120, including data 101, 105, and 109, received from user/application computing systems 100, 103, and 107; gateway computing system 150, including encryption key management system data 130, data ownership determination system 140, memory 153, communication interface 151, and communication interface 155; public cloud 160; and public cloud-based data store 170.

In one embodiment, one or more of user/application computing systems 100, 103, and 107 are end-user computing systems used by one or more end-users to enter and/or create, process, and or otherwise modify or access, data 101, 105, and 109 or any other end user computing system as discussed herein, and/or as known in the art at the time of filing, and/or as developed after the time of filing.

In one embodiment, one or more of user/application computing systems 100, 103, and 107 are application computing systems such as application servers, business applications, or any other application computing system as discussed herein, and/or as known in the art at the time of filing, and/or as developed after the time of filing.

In one embodiment, the end-users associated with user/application computing systems 100, 103, and 107 are the respective "owners" of data 101, 105, and 109.

In one embodiment, one or more of the user/application computing systems 100, 103, and 107 are client computing systems. In one embodiment, one or more of user/application computing systems 100, 103, and 107 are server computing systems that are, in turn, associated with one or more client computing systems. In one embodiment, one or more of user/application computing systems 100, 103, and 107 are representative of multiple user/application computing systems.

As used herein, the term "computing system", such as is included in the terms "user/application computing system" and "gateway computing system" includes, but is not limited to: a portable computer; a workstation; a two-way pager; a cellular telephone; a smart phone; a digital wireless telephone; a Personal Digital Assistant (PDA); a media player, i.e., an MP3 player and/or other music and/or video player; a server computer; an Internet appliance; or any other device that includes components that can execute all, or part, of any one of the processes and/or operations as described herein. In addition, as used herein, the term computing system, can denote, but is not limited to, computing systems made up of multiple: computers; wireless devices; cellular telephones; digital telephones; two-way pagers; PDAs; media players; server computers; or any desired combination of these devices, that are coupled to perform the processes and/or operations as described herein.

In various embodiments, user/application computing system(s) 100, 103 and 107 can be any computing system as defined herein and/or as known in the art at the time of filing and/or as developed thereafter, that includes components that can execute all, or part, of a process for ensuring compliance in public clouds using fine-grained encryption based on data ownership in accordance with at least one of the embodiments as described herein.

In one embodiment, data storage system 120 is an enterprise data store used to receive data 101, 105, and 109 from user/application computing systems 100, 103, and 107. In one embodiment, data storage system 120 is an intermediate data storage system under the control of, accessible by, and/or otherwise associated with, the business, or "enterprise", processing data 101, 105, and 109 via user/application computing systems 100, 103, and 107.

Also shown in FIG. 1 is gateway computing system 150. In various embodiments, gateway computing system 150 is a "chokepoint" system through which all, or a significant portion of, data, such as data 101, 105, and 109, passes before being sent to the public cloud. In various embodiments, gateway computing system 150 can be, but is not limited to: a backup server computing system; a web proxy computing system; or any other "gateway" computing system as discussed herein, and/or as known in the art at the time of filing, and/or as developed after the time of filing.

In various embodiments, gateway computing system 150 can be any computing system as defined herein, and or as known in the art at the time of filing, and/or as developed after the time of filing, that includes components that can execute all, or part, of a process for ensuring compliance in public clouds using fine-grained encryption based on data ownership in accordance with at least one of the embodiments as described herein.

As shown in FIG. 1, gateway computing system 150 includes communication interface 151, for receiving data 101, 105, and 109 from user/application computing systems 100, 103, and 107, and/or data storage system 120, and communication interface 155 for transferring data to public cloud 160.

As shown in FIG. 1, gateway computing system 150 includes encryption key management system data 130 including data representing one or more encryption keys associated with one or more data owners for data 101, 105, and 109. In one embodiment, encryption key management system data 130 is obtained from an enterprise encryption key management server system (not shown) implemented, maintained, and/or associated with, the enterprise processing data 101, 105, and 109.

As shown in FIG. 1, gateway computing system 150 includes data ownership determination system 140. As discussed above, data ownership determination systems use various parameters to determine the ownership of data without having to resort to obtaining input from the data owners themselves at the time of each data transfer. Consequently, using some data ownership determination systems, employees and/or agents of the enterprise that own the data are not disturbed when the data ownership determination takes place and the data ownership determination is transparent from the data owners' perspective. One example of the data ownership determination system is Data Insight Technology™ available from Symantec Corporation of Mountain View, Calif.

As seen in FIG. 1, gateway computing system 150 includes memory 153. As shown in FIG. 1, memory 153 includes at least part of a process for ensuring compliance in public clouds using fine-grained encryption based on data ownership (process 300). Memory 153, and process for ensuring compliance in public clouds using fine-grained encryption based on data ownership 300, are discussed in more detail below with respect to FIGS. 2 and 3.

Also shown in FIG. 1 is public cloud 160. In one embodiment, public cloud 160 is a public cloud such as the Internet. As shown in FIG. 1, gateway computing system 150 is connected to public cloud 160 by communication interface 155.

Also shown in FIG. 1 is public cloud-based data store 170. In one embodiment, public cloud-based data store 170 is a data storage device, a designated server system or computing system, or a designated portion of one or more server systems or computing systems, or a distributed database. In one embodiment, public cloud-based data store 170 is a dedicated mass storage device implemented in hardware, software, or a combination of hardware and software. In one embodiment, public cloud-based data store 170 is a web-based function. As discussed in more detail below, in one embodiment, public cloud-based data store 170 is under the control of, or otherwise accessible by, a process for ensuring compliance in public clouds using fine-grained encryption based on data ownership, such as process 300.

Figure 2:
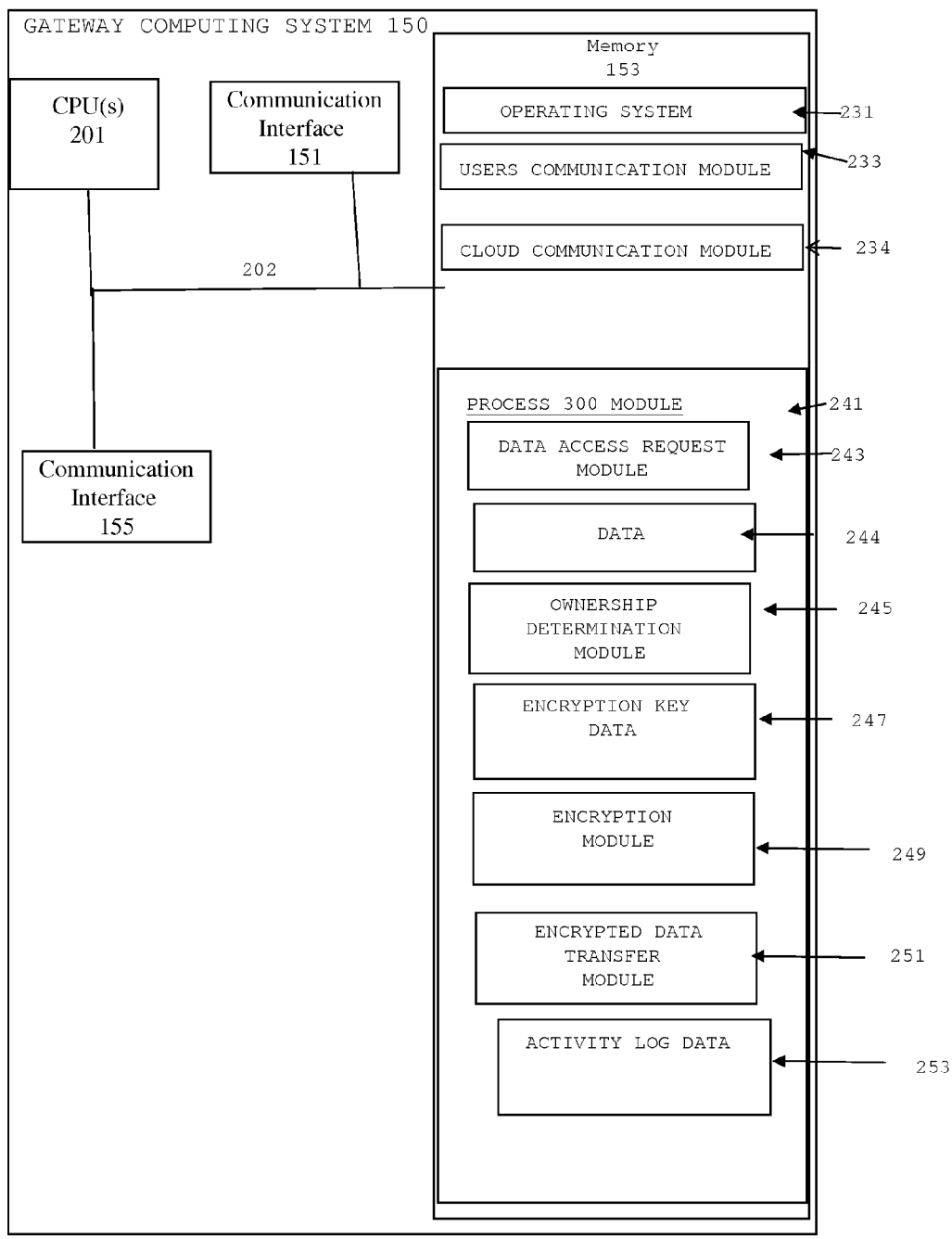
FIG. 2 is a block diagram of the gateway computing system of FIG. 1, in accordance with one embodiment.

Referring now to FIGS. 1 and 2 together, FIG. 2 is a more detailed block diagram of gateway computing system 150. As seen in FIG. 2, in one embodiment, memory 153 can store data and/or instructions associated with, but not limited to, the following elements, subsets of elements, and/or supersets of elements for processing by one or more processors, such as CPUs 201: operating system 231 that includes procedures, data, and/or instructions for handling various services and performing/coordinating hardware dependent tasks; users communication module 233 that includes procedures, data, and/or instructions for providing a data transfer capability for data 101, 105, and 109 between gateway computing system 150 and user/application computing systems 100, 103, and 107, and/or data storage system 120; public cloud communication module 234 that includes procedures, data, and/or instructions for providing a data transfer capability between gateway computing system 150 and public cloud 160 (FIG. 1); and process 300 module 241 that includes procedures, data, and/or instructions, for implementing at least part of a process for ensuring compliance in public clouds using fine-grained encryption based on data ownership 300.

As also seen in FIG. 2, in one embodiment, process 300 module 241 of memory 153 includes: data access request module 243; data 244; ownership determination module 245; encryption key data 247; encryption module 249; encrypted data transfer module 251; and activity log data 253.

In one embodiment, data access request module 243 includes procedures, data, and/or instructions for receiving and/or providing access to data, such as data 244, and for receiving requests to transfer data to the public cloud.

In one embodiment, data 244 includes procedures, data, and/or instructions associated with receiving and processing at least part of data 101, 105, and 109 from user/application computing systems 100, 103, and 107 and or data storage system 120 (FIG. 1).

In one embodiment, ownership determination module 245 includes procedures, data, and/or instructions associated with data ownership determination system 140 (FIG. 1), including, in one embodiment, data indicating the ownership of data 244.

In one embodiment, encryption key data 247 includes procedures, data, and/or instructions associated with encryption key management system data 130 (FIG. 1), including, in one embodiment, data indicating the encryption keys associated with the ownership data of ownership determination module 245 and the data indicating the ownership of data 244.

In one embodiment, encryption module 249 includes procedures, data, and/or instructions for encrypting data 244 in accordance with the data indicating the encryption keys associated with the data of ownership determination module 245 and the data indicating the ownership of data 244.

In one embodiment, encrypted data transfer module 251 includes procedures, data, and/or instructions for transferring encrypted data of encryption module 249 from gateway computing system 150 to public cloud 160 (FIG. 1) and public cloud-based data store 170.

In one embodiment, activity log data 253 includes procedures, data, and/or instructions for tracking all modifications to, access to, and transfers of, data 244.

Those of skill in the art will readily recognize that the choice of components, data, modules, and information shown in FIG. 2, the organization of the components, data, modules, and information shown in FIG. 2, and the manner of storage and location of storage of the data, modules, and information shown in FIG. 2 was made for illustrative purposes only and that other choices of components, data, modules, and information, organization of the components, data, modules, and information, manner of storing, and location of storage, of the data, modules, and information can be implemented without departing from the scope of the invention as set forth in the claims below. In particular, the various modules and/or data shown in FIG. 2 are illustrative only and not limiting. In various other embodiments, the particular modules and/or data shown in FIG. 2 can be grouped together in fewer modules and/or data locations or divided among more modules and/or data locations. Consequently, those of skill in the art will recognize that other orders and/or grouping are possible and the particular modules and/or data, order, and/or grouping shown in FIG. 2 discussed herein do not limit the scope as claimed below.

A more detailed discussion of the operation of gateway computing system 150, memory 153, and process 300 module 241 of memory 153 is provided below with respect to FIG. 3.

Figure 3:
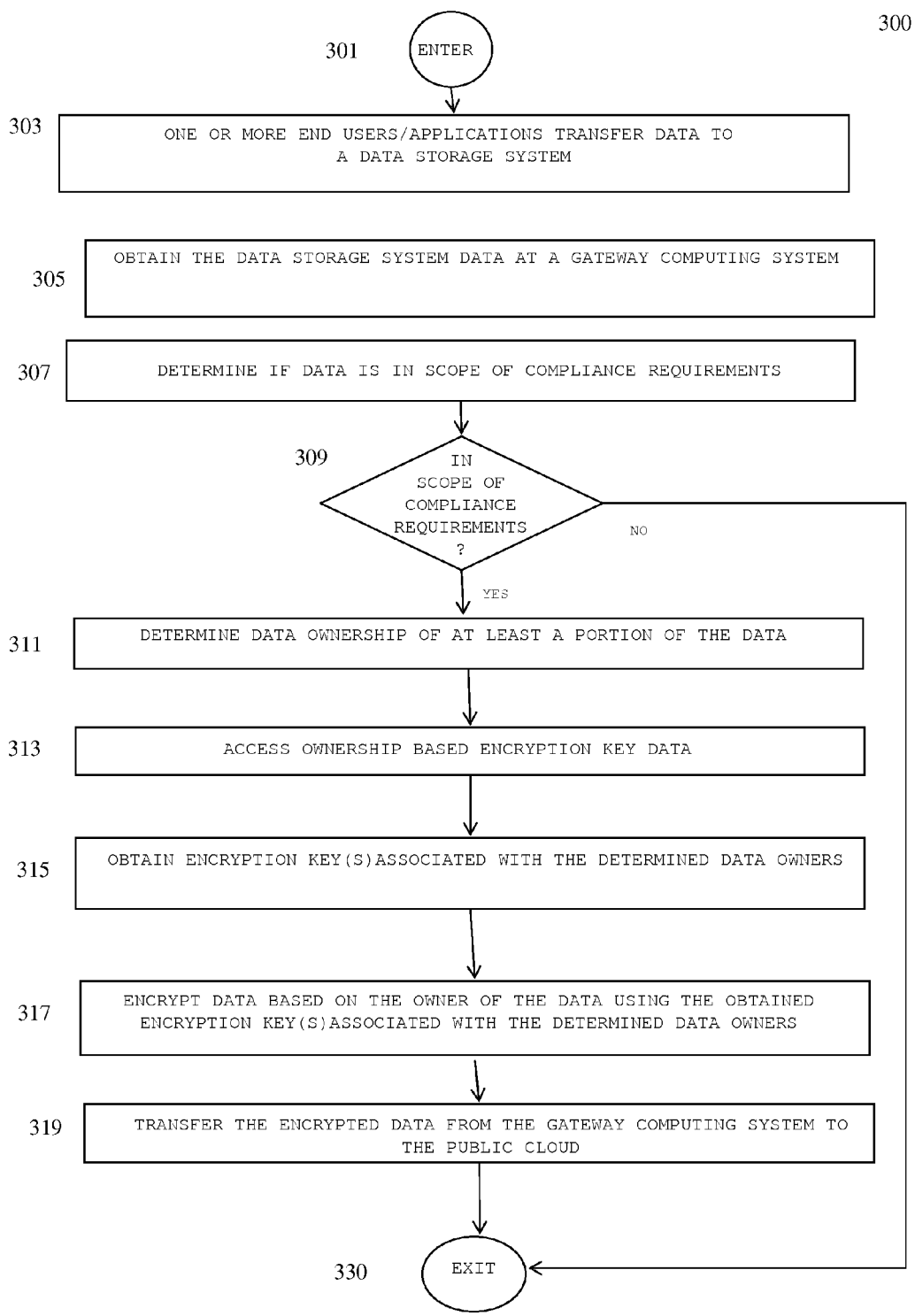
FIG. 3 is a flow chart depicting a process for ensuring compliance in public clouds using fine-grained encryption based on data ownership in accordance with one embodiment.

Referring to FIGS. 1, 2, and 3, FIG. 3 is a flowchart depicting a process for ensuring compliance in public clouds using fine-grained encryption based on data ownership 300 in accordance with one embodiment.

Process for ensuring compliance in public clouds using fine-grained encryption based on data ownership 300 begins at ENTER OPERATION 301 and process flow proceeds to ONE OR MORE END USERS/APPLICATIONS TRANSFER DATA TO A DATA STORAGE SYSTEM OPERATION 303.

In one embodiment, at ONE OR MORE END USERS/APPLICATIONS TRANSFER DATA TO A DATA STORAGE SYSTEM OPERATION 303 data is entered, processed, created, and/or otherwise modified or accessed by an end-user and is then saved to a data storage system by one or more end-user computing systems and/or application computing systems.

In one embodiment, at ONE OR MORE END USERS/APPLICATIONS TRANSFER DATA TO A DATA STORAGE SYSTEM OPERATION 303 the end-user that entered, processed, created, and/or otherwise modified or accessed, the data is the "owner" of the data to be saved and or accessed.

In one embodiment, at ONE OR MORE END USERS/APPLICATIONS TRANSFER DATA TO A DATA STORAGE SYSTEM OPERATION 303 the data is saved to a data storage system that can be a data storage device, a designated server system, a designated computing system, or a designated portion of one or more server systems or computing systems, or a distributed database. In one embodiment, the data is saved to a data storage system that can be a dedicated mass storage device implemented in software, hardware, or a combination of hardware and software. In one embodiment, at ONE OR MORE END USERS/APPLICATIONS TRANSFER DATA TO A DATA STORAGE SYSTEM OPERATION 303 the data is saved to a data storage system such as data storage system 120 of FIG. 1. Returning to FIG. 3, In one embodiment, at ONE OR MORE END USERS/APPLICATIONS TRANSFER DATA TO A DATA STORAGE SYSTEM OPERATION 303 the data is saved using any data storage system as discussed herein, and/or as known in the art at the time of filing, and/or as developed after the time of filing.

In one embodiment, once data is entered, processed, created, and/or otherwise modified or accessed, by an end-user and is then saved to a data storage system at ONE OR MORE END USERS/APPLICATIONS TRANSFER DATA TO A DATA STORAGE SYSTEM OPERATION 303, process flow proceeds to OBTAIN THE DATA STORAGE SYSTEM DATA AT A GATEWAY COMPUTING SYSTEM OPERATION 305.

In one embodiment, at OBTAIN THE DATA STORAGE SYSTEM DATA AT A GATEWAY COMPUTING SYSTEM OPERATION 305 at least part of the data from ONE OR MORE END USERS/APPLICATIONS TRANSFER DATA TO A DATA STORAGE SYSTEM OPERATION 303 is transferred to a gateway computing system for processing prior to being sent to, or accessed from, the public cloud.

In one embodiment, at OBTAIN THE DATA STORAGE SYSTEM DATA AT A GATEWAY COMPUTING SYSTEM OPERATION 305 the data is sent to a gateway computing system such as gateway computing system 150 of FIG. 1.

Returning to FIG. 3, in various embodiments, the gateway computing system of OBTAIN THE DATA STORAGE SYSTEM DATA AT A GATEWAY COMPUTING SYSTEM OPERATION 305 is a "chokepoint" through which all, or a significant portion of, data passes before being sent to the public cloud. In various embodiments, the gateway computing system of OBTAIN THE DATA STORAGE SYSTEM DATA AT A GATEWAY COMPUTING SYSTEM OPERATION 305 can be, but is not limited to: a backup server computing system; a web proxy computing system; or any other "gateway" computing system as discussed herein, and/or as known in the art at the time of filing, and/or as developed after the time of filing.

In one embodiment, once at least part of the data from ONE OR MORE END USERS/APPLICATIONS TRANSFER DATA TO A DATA STORAGE SYSTEM OPERATION 303 is transferred to a gateway computing system for processing prior to being sent to, or accessed from, the public cloud at OBTAIN THE DATA STORAGE SYSTEM DATA AT A GATEWAY COMPUTING SYSTEM OPERATION 305, process flow proceeds to DETERMINE IF DATA IS IN SCOPE OF COMPLIANCE REQUIREMENTS OPERATION 307.

In one embodiment, at DETERMINE IF DATA IS IN SCOPE OF COMPLIANCE REQUIREMENTS OPERATION 307 the data of ONE OR MORE END USERS/APPLICATIONS TRANSFER DATA TO A DATA STORAGE SYSTEM OPERATION 303 is analyzed to determine the data classification and whether the data is in compliance scope, i.e., is subject to one or more regulatory policies and/or regulations.

As noted above, currently there exist several regulatory policies and/or organizations that are charged with regulating access and use of certain types of "sensitive" data associated with individuals such as payment data, healthcare related data, and various types of other financial and personal data. These regulatory policies and/or organizations include, but are not limited to: the Payment Card Industry Data Security Standard (PCI DSS); the Health Insurance Portability and Accountability Act (HIPAA); and the Sarbanes-Oxley Act, among others. As also noted above, many of these regulatory policies and/or organizations require specific access protocols, technical controls, regular reporting, audit trails, and proof of implementation, related to the accessing and transport of, use of, and processing of, various types of data.

In one embodiment, at DETERMINE IF DATA IS IN SCOPE OF COMPLIANCE REQUIREMENTS OPERATION 307 the data of ONE OR MORE END USERS/APPLICATIONS TRANSFER DATA TO A DATA STORAGE SYSTEM OPERATION 303 is analyzed by one or more processors, such as CPUs 201 of FIG. 2, to determine the data classification and whether the data is in compliance scope, i.e., is subject to one or more regulatory policies and/or regulations.

Those of skill in the art will recognize that, in some embodiments, the analysis of the data of ONE OR MORE END USERS/APPLICATIONS TRANSFER DATA TO A DATA STORAGE SYSTEM OPERATION 303 to determine the data classification and whether the data is in compliance scope of DETERMINE IF DATA IS IN SCOPE OF COMPLIANCE REQUIREMENTS OPERATION 307 can be performed prior to OBTAIN THE DATA STORAGE SYSTEM DATA AT A GATEWAY COMPUTING SYSTEM OPERATION 305 and before the data from ONE OR MORE END USERS/APPLICATIONS TRANSFER DATA TO A DATA STORAGE SYSTEM OPERATION 303 is transferred to the gateway computing system. Consequently, the specific order of operations discussed herein is for illustrative purposes only and the particular order and or grouping shown and discussed herein are not limiting. In addition, those of skill in the art will recognize that other orders and/or groupings of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be regrouped as portions of one or more other of the process steps and/or operations and/or instructions discussed herein. Consequently the particular order and or grouping of the process steps and/or operations and/or instructions discussed herein do not limit the scope of the invention as claimed below.

In one embodiment, once the data of ONE OR MORE END USERS/APPLICATIONS TRANSFER DATA TO A DATA STORAGE SYSTEM OPERATION 303 is analyzed to determine the data classification and whether the data is in compliance scope at DETERMINE IF DATA IS IN SCOPE OF COMPLIANCE REQUIREMENTS OPERATION 307 process flow proceeds to IN SCOPE OF COMPLIANCE REQUIREMENTS? OPERATION 309.

In one embodiment, if, at IN SCOPE OF COMPLIANCE REQUIREMENTS? OPERATION 309 the data of DETERMINE IF DATA IS IN SCOPE OF COMPLIANCE REQUIREMENTS OPERATION 307 is determined not to be subject to one or more regulatory policies and/or regulations, i.e., the result is "NO", then the data is sent directly to EXIT OPERATION 330 and, in some embodiments, is transferred to the public cloud without further processing by process for ensuring compliance in public clouds using fine-grained encryption based on data ownership 300.

On the other hand, in one embodiment, if, at IN SCOPE OF COMPLIANCE REQUIREMENTS? OPERATION 309 the data of DETERMINE IF DATA IS IN SCOPE OF COMPLIANCE REQUIREMENTS OPERATION 307 is determined to be subject to one or more regulatory policies and/or regulations, i.e., the result is "YES", then process flow proceeds to DETERMINE DATA OWNERSHIP OF AT LEAST A PORTION OF THE DATA OPERATION 311.

In one embodiment, at DETERMINE DATA OWNERSHIP OF AT LEAST A PORTION OF THE DATA OPERATION 311 the data ownership of at least part of the data of OBTAIN THE DATA STORAGE SYSTEM DATA AT A GATEWAY COMPUTING SYSTEM OPERATION 305 is determined at the gateway computing system using a data ownership determination system.

In one embodiment, at DETERMINE DATA OWNERSHIP OF AT LEAST A PORTION OF THE DATA OPERATION 311 the data ownership of at least part of the data of OBTAIN THE DATA STORAGE SYSTEM DATA AT A GATEWAY COMPUTING SYSTEM OPERATION 305 is determined at the gateway computing system using a data ownership determination system and under the direction of one or more processors, such as CPUs 201 of FIG. 2.

Returning to FIG. 3, in one embodiment, at DETERMINE DATA OWNERSHIP OF AT LEAST A PORTION OF THE DATA OPERATION 311 the data ownership, i.e., the end-user who entered, processed, created, and/or otherwise modified or accessed, the data at ONE OR MORE END USERS/APPLICATIONS TRANSFER DATA TO A DATA STORAGE SYSTEM OPERATION 303 is determined at the gateway computing system using a data ownership determination system.

Currently, as noted above, data ownership determination systems use various parameters to determine the ownership of data automatically without having to resort to obtaining input from the data owners themselves at the time the data is saved and/or transferred and/or accessed and/or backed up. Consequently, using some data ownership determination systems, employees and/or agents of the enterprise that own the data are not disturbed as a data ownership determination takes place transparently from the data owners' perspective.

One example of a currently available data ownership determination system is Data Insight Technology™ available from Symantec Corporation of Mountain View, Calif.

In one embodiment, once the data ownership of at least part of the data of OBTAIN THE DATA STORAGE SYSTEM DATA AT A GATEWAY COMPUTING SYSTEM OPERATION 305 is determined at the gateway computing system using a data ownership determination system at DETERMINE DATA OWNERSHIP OF AT LEAST A PORTION OF THE DATA OPERATION 311, process flow proceeds to ACCESS OWNERSHIP BASED ENCRYPTION KEY DATA OPERATION 313.

In one embodiment, at ACCESS OWNERSHIP BASED ENCRYPTION KEY DATA OPERATION 313 access to data representing the encryption keys associated with the identified data owners of DETERMINE DATA OWNERSHIP OF AT LEAST A PORTION OF THE DATA OPERATION 311 is obtained.

In various embodiments, at ACCESS OWNERSHIP BASED ENCRYPTION KEY DATA OPERATION 313 access to data representing the encryption keys associated with the identified data owners is obtained by gaining access to an enterprise encryption key management server system implemented by the enterprise.

In various embodiments, at ACCESS OWNERSHIP BASED ENCRYPTION KEY DATA OPERATION 313 access to data representing the encryption keys associated with the identified data owners is obtained by gaining access to any source of encryption key data as discussed herein, and/or as known in the art at the time of filing, and/or as developed after the time of filing.

In one embodiment, at ACCESS OWNERSHIP BASED ENCRYPTION KEY DATA OPERATION 313 access to data representing the encryption keys associated with the identified data owners is obtained under the direction of one or more processors, such as CPUs 201 of FIG. 2.

Returning to FIG. 3, in one embodiment, once access to data representing the encryption keys associated with the identified data owners of DETERMINE DATA OWNERSHIP OF AT LEAST A PORTION OF THE DATA OPERATION 311 is obtained at ACCESS OWNERSHIP BASED ENCRYPTION KEY DATA OPERATION 313 process flow proceeds to OBTAIN ENCRYPTION KEY(S) ASSOCIATED WITH THE DETERMINED DATA OWNERS OPERATION 315.

In one embodiment, at OBTAIN ENCRYPTION KEY(S) ASSOCIATED WITH THE DETERMINED DATA OWNERS OPERATION 315 once the data ownership is determined at DETERMINE DATA OWNERSHIP OF AT LEAST A PORTION OF THE DATA OPERATION 311 and access to the ownership based encryption key data is obtained at ACCESS OWNERSHIP BASED ENCRYPTION KEY DATA OPERATION 313, the encryption keys associated with the identified data owners are obtained.

In one embodiment, at OBTAIN ENCRYPTION KEY(S) ASSOCIATED WITH THE DETERMINED DATA OWNERS OPERATION 315 data representing the encryption keys associated with the identified data owners is obtained from an enterprise encryption key management server system implemented by the enterprise.

In various embodiments at OBTAIN ENCRYPTION KEY(S) ASSOCIATED WITH THE DETERMINED DATA OWNERS OPERATION 315 data representing the encryption keys associated with the identified data owners is obtained from any source of encryption key data as discussed herein, and/or as known in the art at the time of filing, and/or as developed after the time of filing.

In one embodiment, at ACCESS OWNERSHIP BASED ENCRYPTION KEY DATA OPERATION 313 data representing the encryption keys associated with the identified data owners is obtained under the direction of one or more processors, such as CPUs 201 of FIG. 2.

Returning to FIG. 3, once the data ownership is determined at DETERMINE DATA OWNERSHIP OF AT LEAST A PORTION OF THE DATA OPERATION 311 and the encryption keys associated with the identified data owners are obtained at OBTAIN ENCRYPTION KEY(S) ASSOCIATED WITH THE DETERMINED DATA OWNERS OPERATION 315, process flow proceeds to ENCRYPT DATA BASED ON THE OWNER OF THE DATA USING THE OBTAINED ENCRYPTION KEY(S) ASSOCIATED WITH THE DETERMINED DATA OWNERS OPERATION 317.

In one embodiment, at ENCRYPT DATA BASED ON THE OWNER OF THE DATA USING THE OBTAINED ENCRYPTION KEY(S) ASSOCIATED WITH THE DETERMINED DATA OWNERS OPERATION 317 the data of OBTAIN THE DATA STORAGE SYSTEM DATA AT A GATEWAY COMPUTING SYSTEM OPERATION 305 is encrypted using the respective encryption keys associated with the data owners of OBTAIN ENCRYPTION KEY(S) ASSOCIATED WITH THE DETERMINED DATA OWNERS OPERATION 315.

In one embodiment, at ENCRYPT DATA BASED ON THE OWNER OF THE DATA USING THE OBTAINED ENCRYPTION KEY(S) ASSOCIATED WITH THE DETERMINED DATA OWNERS OPERATION 317 the data of OBTAIN THE DATA STORAGE SYSTEM DATA AT A GATEWAY COMPUTING SYSTEM OPERATION 305 is encrypted using the respective encryption keys associated with the data owners of OBTAIN ENCRYPTION KEY(S) ASSOCIATED WITH THE DETERMINED DATA OWNERS OPERATION 315 under the direction of one or more processors, such as CPUs 201 of FIG. 2.

Returning to FIG. 3, in one embodiment, once the data of OBTAIN THE DATA STORAGE SYSTEM DATA AT A GATEWAY COMPUTING SYSTEM OPERATION 305 is encrypted using the respective encryption keys associated with the data owners of OBTAIN ENCRYPTION KEY(S) ASSOCIATED WITH THE DETERMINED DATA OWNERS OPERATION 315 at ENCRYPT DATA BASED ON THE OWNER OF THE DATA USING THE OBTAINED ENCRYPTION KEY(S) ASSOCIATED WITH THE DETERMINED DATA OWNERS OPERATION 317, process flow proceeds to TRANSFER THE ENCRYPTED DATA FROM THE GATEWAY COMPUTING SYSTEM TO THE PUBLIC CLOUD OPERATION 319.

In one embodiment, at TRANSFER THE ENCRYPTED DATA FROM THE GATEWAY COMPUTING SYSTEM TO THE PUBLIC CLOUD OPERATION 319 the data of OBTAIN THE DATA STORAGE SYSTEM DATA AT A GATEWAY COMPUTING SYSTEM OPERATION 305 is sent to, and/or stored in, and/or accessed from, the public cloud as the ownership based fine-grained encrypted data generated at ENCRYPT DATA BASED ON THE OWNER OF THE DATA USING THE OBTAINED ENCRYPTION KEY(S) ASSOCIATED WITH THE DETERMINED DATA OWNERS OPERATION 317.

In one embodiment, at TRANSFER THE ENCRYPTED DATA FROM THE GATEWAY COMPUTING SYSTEM TO THE PUBLIC CLOUD OPERATION 319 the ownership based fine-grained encrypted data generated at ENCRYPT DATA BASED ON THE OWNER OF THE DATA USING THE OBTAINED ENCRYPTION KEY(S) ASSOCIATED WITH THE DETERMINED DATA OWNERS OPERATION 317 is sent to, and/or stored in, and/or accessed from, a public cloud such as the Internet.

In one embodiment, at TRANSFER THE ENCRYPTED DATA FROM THE GATEWAY COMPUTING SYSTEM TO THE PUBLIC CLOUD OPERATION 319 the ownership based fine-grained encrypted data generated at ENCRYPT DATA BASED ON THE OWNER OF THE DATA USING THE OBTAINED ENCRYPTION KEY(S) ASSOCIATED WITH THE DETERMINED DATA OWNERS OPERATION 317 is sent to, and/or stored in, and/or accessed from, any public cloud, and/or network, as discussed herein, and/or as known in the art at the time of filing, and/or as developed after the time of filing.

In one embodiment, once the ownership based fine-grained encrypted data of ENCRYPT DATA BASED ON THE OWNER OF THE DATA USING THE OBTAINED ENCRYPTION KEY(S) ASSOCIATED WITH THE DETERMINED DATA OWNERS OPERATION 317 is sent to, and/or stored in, and/or accessed from, the public cloud at TRANSFER THE ENCRYPTED DATA FROM THE GATEWAY COMPUTING SYSTEM TO THE PUBLIC CLOUD OPERATION 319, process flow proceeds to EXIT OPERATION 330 where process for ensuring compliance and public clouds using fine-grained encryption based on data ownership 300 is exited to await you data.

Using process for ensuring compliance in public clouds using fine-grained encryption based on data ownership 300, the principle of least privilege necessary to meet the requirements of several compliance regulations is met by establishing data ownership, obtaining the relevant encryption keys based on the data ownership, and encrypting the data using the relevant encryption keys, automatically at a gateway computing system prior to the data being transferred to the public cloud. In this way, the encryption, and the required level of security compliance, can be performed in a manner that is easily verified and is virtually effortless and transparent to the end-user. Consequently using process for ensuring compliance in public clouds using fine-grained encryption based on data ownership 300, enterprises can obtain the benefits of using a public cloud computing model while still meeting, and maintaining the ability to prove they are meeting, data security compliance regulations, and without placing any significant security-related burden on their employees and/or agents.

In one embodiment, the process for ensuring compliance in public clouds using fine-grained encryption based on data ownership discussed herein is implemented as part of a public cloud data backup system.

Figure 4:
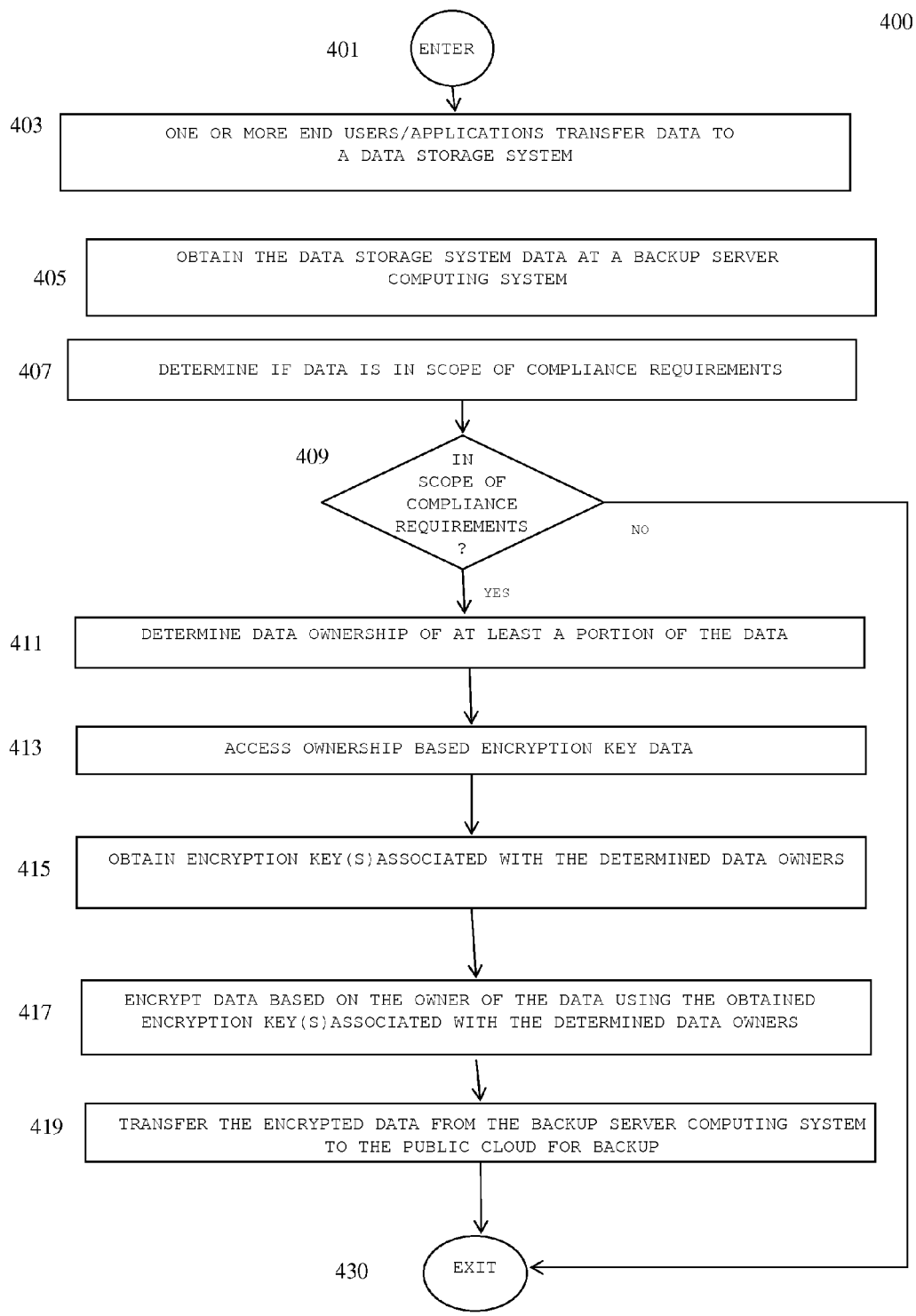
FIG. 4 is a flow chart depicting a process for ensuring compliance in public clouds using fine-grained encryption based on data ownership in accordance with one embodiment.

FIG. 4 is a flowchart depicting a process for ensuring compliance in public clouds using fine-grained encryption based on data ownership 400 in accordance with one embodiment.

Process for ensuring compliance in public clouds using fine-grained encryption based on data ownership 400 begins at ENTER OPERATION 401 and process flow proceeds to ONE OR MORE END USERS/APPLICATIONS TRANSFER DATA TO A DATA STORAGE SYSTEM OPERATION 403.

In one embodiment, at ONE OR MORE END USERS/APPLICATIONS TRANSFER DATA TO A DATA STORAGE SYSTEM OPERATION 403 data is entered, processed, created, and/or otherwise modified or accessed by an end-user and is then saved to a data storage system by one or more end-user computing systems and/or application computing systems.

In one embodiment, at ONE OR MORE END USERS/APPLICATIONS TRANSFER DATA TO A DATA STORAGE SYSTEM OPERATION 403 the end-user that entered, processed, created, and/or otherwise modified or accessed, the data is the "owner" of the data to be saved and or accessed.

In one embodiment, at ONE OR MORE END USERS/APPLICATIONS TRANSFER DATA TO A DATA STORAGE SYSTEM OPERATION 403 the data is saved to a data storage system that can be a data storage device, a designated server system, a designated computing system, or a designated portion of one or more server systems or computing systems, or a distributed database. In one embodiment, the data is saved to a data storage system that can be a dedicated mass storage device implemented in software, hardware, or a combination of hardware and software. In one embodiment, at ONE OR MORE END USERS/APPLICATIONS TRANSFER DATA TO A DATA STORAGE SYSTEM OPERATION 403 the data is saved to a data storage system such as data storage system 120 of FIG. 1. Returning to FIG. 4, in one embodiment, at ONE OR MORE END USERS/APPLICATIONS TRANSFER DATA TO A DATA STORAGE SYSTEM OPERATION 403 the data is saved using any data storage system as discussed herein, and/or as known in the art at the time of filing, and/or as developed after the time of filing.

In one embodiment, once data is entered, processed, created, and/or otherwise modified or accessed, by an end-user and is then saved to a data storage system at ONE OR MORE END USERS/APPLICATIONS TRANSFER DATA TO A DATA STORAGE SYSTEM OPERATION 403, process flow proceeds to OBTAIN THE DATA STORAGE SYSTEM DATA AT A BACKUP SERVER COMPUTING SYSTEM OPERATION 405.

In one embodiment, at OBTAIN THE DATA STORAGE SYSTEM DATA AT A BACKUP SERVER COMPUTING SYSTEM OPERATION 405 at least part of the data from ONE OR MORE END USERS/APPLICATIONS TRANSFER DATA TO A DATA STORAGE SYSTEM OPERATION 403 is transferred to a backup server computing system, or similar gateway computing system, for processing prior to being sent to, i.e., backed up to, the public cloud.

In one embodiment, at OBTAIN THE DATA STORAGE SYSTEM DATA AT A BACKUP SERVER COMPUTING SYSTEM OPERATION 405 the data is sent to a backup server computing system such as gateway computing system 150 of FIG. 1.

Returning to FIG. 4, in various embodiments, the backup server computing system of OBTAIN THE DATA STORAGE SYSTEM DATA AT A BACKUP SERVER COMPUTING SYSTEM OPERATION 405 is a "chokepoint" through which all, or a significant portion of, data passes before being sent to the public cloud, such as any gateway computing system discussed herein, and/or as known in the art at the time of filing, and/or as developed after the time of filing.

In one embodiment, once at least part of the data from ONE OR MORE END USERS/APPLICATIONS TRANSFER DATA TO A DATA STORAGE SYSTEM OPERATION 403 is transferred to a backup server computing system for processing prior to being sent to, i.e., backed up to, the public cloud at OBTAIN THE DATA STORAGE SYSTEM DATA AT A BACKUP SERVER COMPUTING SYSTEM OPERATION 405, process flow proceeds to DETERMINE IF DATA IS IN SCOPE OF COMPLIANCE REQUIREMENTS OPERATION 407.

In one embodiment, at DETERMINE IF DATA IS IN SCOPE OF COMPLIANCE REQUIREMENTS OPERATION 407 the data of ONE OR MORE END USERS/APPLICATIONS TRANSFER DATA TO A DATA STORAGE SYSTEM OPERATION 403 is analyzed to determine the data classification and whether the data is in compliance scope, i.e., is subject to one or more regulatory policies and/or regulations.

As noted above, currently there exist several regulatory policies and/or organizations that are charged with regulating access and use of certain types of "sensitive" data associated with individuals such as payment data, healthcare related data, and various types of other financial and personal data. These regulatory policies and/or organizations include, but are not limited to: the Payment Card Industry Data Security Standard (PCI DSS); the Health Insurance Portability and Accountability Act (HIPAA); and the Sarbanes-Oxley Act, among others. As also noted above, many of these regulatory policies and/or organizations require specific access protocols, technical controls, regular reporting, audit trails, and proof of implementation, related to the accessing and transport of, use of, and processing of, various types of data.

In one embodiment, at DETERMINE IF DATA IS IN SCOPE OF COMPLIANCE REQUIREMENTS OPERATION 407 the data of ONE OR MORE END USERS/APPLICATIONS TRANSFER DATA TO A DATA STORAGE SYSTEM OPERATION 403 is analyzed by one or more processors, such as CPUs 201 of FIG. 2, to determine the data classification and whether the data is in compliance scope, i.e., is subject to one or more regulatory policies and/or regulations.

Those of skill in the art will recognize that, in some embodiments, the analysis of the data of ONE OR MORE END USERS/APPLICATIONS TRANSFER DATA TO A DATA STORAGE SYSTEM OPERATION 403 to determine the data classification and whether the data is in compliance scope of DETERMINE IF DATA IS IN SCOPE OF COMPLIANCE REQUIREMENTS OPERATION 407 can be performed prior to OBTAIN THE DATA STORAGE SYSTEM DATA AT A BACKUP SERVER COMPUTING SYSTEM OPERATION 405 and before the data from ONE OR MORE END USERS/APPLICATIONS TRANSFER DATA TO A DATA STORAGE SYSTEM OPERATION 403 is transferred to the backup server computing system. Consequently, the specific order of operations discussed herein is for illustrative purposes only and the particular order and or grouping shown and discussed herein are not limiting. In addition, those of skill in the art will recognize that other orders and/or groupings of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be regrouped as portions of one or more other of the process steps and/or operations and/or instructions discussed herein. Consequently the particular order and or grouping of the process steps and/or operations and/or instructions discussed herein do not limit the scope of the invention as claimed below.

In one embodiment, once the data of ONE OR MORE END USERS/APPLICATIONS TRANSFER DATA TO A DATA STORAGE SYSTEM OPERATION 403 is analyzed to determine the data classification and whether the data is in compliance scope at DETERMINE IF DATA IS IN SCOPE OF COMPLIANCE REQUIREMENTS OPERATION 407 process flow proceeds to IN SCOPE OF COMPLIANCE REQUIREMENTS? OPERATION 409.

In one embodiment, if, at IN SCOPE OF COMPLIANCE REQUIREMENTS? OPERATION 409 the data of DETERMINE IF DATA IS IN SCOPE OF COMPLIANCE REQUIREMENTS OPERATION 407 is determined not to be subject to one or more regulatory policies and/or regulations, i.e., the result is "NO", then the data is sent directly to EXIT OPERATION 430 and, in some embodiments, is backed up to the public cloud without further processing by process for ensuring compliance in public clouds using fine-grained encryption based on data ownership 400.

On the other hand, in one embodiment, if, at IN SCOPE OF COMPLIANCE REQUIREMENTS? OPERATION 409 the data of DETERMINE IF DATA IS IN SCOPE OF COMPLIANCE REQUIREMENTS OPERATION 407 is determined to be subject to one or more regulatory policies and/or regulations, i.e., the result is "YES", then process flow proceeds to DETERMINE DATA OWNERSHIP OF AT LEAST A PORTION OF THE DATA OPERATION 411.

In one embodiment, at DETERMINE DATA OWNERSHIP OF AT LEAST A PORTION OF THE DATA OPERATION 411 the data ownership of at least part of the data of OBTAIN THE DATA STORAGE SYSTEM DATA AT A BACKUP SERVER COMPUTING SYSTEM OPERATION 405 is determined at the backup server computing system using a data ownership determination system.

In one embodiment, at DETERMINE DATA OWNERSHIP OF AT LEAST A PORTION OF THE DATA OPERATION 411 the data ownership of at least part of the data of OBTAIN THE DATA STORAGE SYSTEM DATA AT A BACKUP SERVER COMPUTING SYSTEM OPERATION 405 is determined at the backup server computing system using a data ownership determination system and under the direction of one or more processors, such as CPUs 201 of FIG. 2.

Returning to FIG. 4, in one embodiment, at DETERMINE DATA OWNERSHIP OF AT LEAST A PORTION OF THE DATA OPERATION 411 the data ownership, i.e., the end-user who entered, processed, created, and/or otherwise modified or accessed, the data at ONE OR MORE END USERS/APPLICATIONS TRANSFER DATA TO A DATA STORAGE SYSTEM OPERATION 403 is determined at the backup server computing system using a data ownership determination system.

Currently, as noted above, data ownership determination systems use various parameters to determine the ownership of data automatically without having to resort to obtaining input from the data owners themselves at the time the data is saved and/or transferred and/or accessed and/or backed up. Consequently, using some data ownership determination systems, employees and/or agents of the enterprise that own the data are not disturbed as a data ownership determination takes place transparently from the data owners' perspective.

One example of a currently available data ownership determination system is Data Insight Technology™ available from Symantec Corporation of Mountain View, Calif.

In one embodiment, once the data ownership of at least part of the data of OBTAIN THE DATA STORAGE SYSTEM DATA AT A BACKUP SERVER COMPUTING SYSTEM OPERATION 405 is determined at the backup server computing system using a data ownership determination system at DETERMINE DATA OWNERSHIP OF AT LEAST A PORTION OF THE DATA OPERATION 411, process flow proceeds to ACCESS OWNERSHIP BASED ENCRYPTION KEY DATA OPERATION 413.

In one embodiment, at ACCESS OWNERSHIP BASED ENCRYPTION KEY DATA OPERATION 413 access to data representing the encryption keys associated with the identified data owners of DETERMINE DATA OWNERSHIP OF AT LEAST A PORTION OF THE DATA OPERATION 411 is obtained.

In various embodiments, at ACCESS OWNERSHIP BASED ENCRYPTION KEY DATA OPERATION 413 access to data representing the encryption keys associated with the identified data owners is obtained by gaining access to an enterprise encryption key management server system implemented by the enterprise.

In various embodiments, at ACCESS OWNERSHIP BASED ENCRYPTION KEY DATA OPERATION 413 access to data representing the encryption keys associated with the identified data owners is obtained by gaining access to any source of encryption key data as discussed herein, and/or as known in the art at the time of filing, and/or as developed after the time of filing.

In one embodiment, at ACCESS OWNERSHIP BASED ENCRYPTION KEY DATA OPERATION 413 access to data representing the encryption keys associated with the identified data owners is obtained under the direction of one or more processors, such as CPUs 201 of FIG. 2.

Returning to FIG. 4, in one embodiment, once access to data representing the encryption keys associated with the identified data owners of DETERMINE DATA OWNERSHIP OF AT LEAST A PORTION OF THE DATA OPERATION 411 is obtained at ACCESS OWNERSHIP BASED ENCRYPTION KEY DATA OPERATION 413 process flow proceeds to OBTAIN ENCRYPTION KEY(S) ASSOCIATED WITH THE DETERMINED DATA OWNERS OPERATION 415.

In one embodiment, at OBTAIN ENCRYPTION KEY(S) ASSOCIATED WITH THE DETERMINED DATA OWNERS OPERATION 415, once the data ownership is determined at DETERMINE DATA OWNERSHIP OF AT LEAST A PORTION OF THE DATA OPERATION 411 and access to the ownership based encryption key data is obtained at ACCESS OWNERSHIP BASED ENCRYPTION KEY DATA OPERATION 413, the encryption keys associated with the identified data owners are obtained.

In one embodiment, at OBTAIN ENCRYPTION KEY(S) ASSOCIATED WITH THE DETERMINED DATA OWNERS OPERATION 415 data representing the encryption keys associated with the identified data owners is obtained from an enterprise encryption key management server system implemented by the enterprise.

In various embodiments at OBTAIN ENCRYPTION KEY(S) ASSOCIATED WITH THE DETERMINED DATA OWNERS OPERATION 415 data representing the encryption keys associated with the identified data owners is obtained from any source of encryption key data as discussed herein, and/or as known in the art at the time of filing, and/or as developed after the time of filing.

In one embodiment, at ACCESS OWNERSHIP BASED ENCRYPTION KEY DATA OPERATION 413 data representing the encryption keys associated with the identified data owners is obtained under the direction of one or more processors, such as CPUs 201 of FIG. 2.

Returning to FIG. 4, once the data ownership is determined at DETERMINE DATA OWNERSHIP OF AT LEAST A PORTION OF THE DATA OPERATION 411 and the encryption keys associated with the identified data owners are obtained at OBTAIN ENCRYPTION KEY(S) ASSOCIATED WITH THE DETERMINED DATA OWNERS OPERATION 415, process flow proceeds to ENCRYPT DATA BASED ON THE OWNER OF THE DATA USING THE OBTAINED ENCRYPTION KEY(S) ASSOCIATED WITH THE DETERMINED DATA OWNERS OPERATION 417.

In one embodiment, at ENCRYPT DATA BASED ON THE OWNER OF THE DATA USING THE OBTAINED ENCRYPTION KEY(S) ASSOCIATED WITH THE DETERMINED DATA OWNERS OPERATION 417 the data of OBTAIN THE DATA STORAGE SYSTEM DATA AT A BACKUP SERVER COMPUTING SYSTEM OPERATION 405 is encrypted using the respective encryption keys associated with the data owners of OBTAIN ENCRYPTION KEY(S) ASSOCIATED WITH THE DETERMINED DATA OWNERS OPERATION 415.

In one embodiment, at ENCRYPT DATA BASED ON THE OWNER OF THE DATA USING THE OBTAINED ENCRYPTION KEY(S) ASSOCIATED WITH THE DETERMINED DATA OWNERS OPERATION 417 the data of OBTAIN THE DATA STORAGE SYSTEM DATA AT A BACKUP SERVER COMPUTING SYSTEM OPERATION 405 is encrypted using the respective encryption keys associated with the data owners of OBTAIN ENCRYPTION KEY(S) ASSOCIATED WITH THE DETERMINED DATA OWNERS OPERATION 415 under the direction of one or more processors, such as CPUs 201 of FIG. 2.

Returning to FIG. 4, in one embodiment, once the data of OBTAIN THE DATA STORAGE SYSTEM DATA AT A BACKUP SERVER COMPUTING SYSTEM OPERATION 405 is encrypted using the respective encryption keys associated with the data owners of OBTAIN ENCRYPTION KEY(S) ASSOCIATED WITH THE DETERMINED DATA OWNERS OPERATION 415 at ENCRYPT DATA BASED ON THE OWNER OF THE DATA USING THE OBTAINED ENCRYPTION KEY(S) ASSOCIATED WITH THE DETERMINED DATA OWNERS OPERATION 417, process flow proceeds to TRANSFER THE ENCRYPTED DATA FROM THE BACKUP SERVER COMPUTING SYSTEM TO THE PUBLIC CLOUD FOR BACKUP OPERATION 419.

In one embodiment, at TRANSFER THE ENCRYPTED DATA FROM THE BACKUP SERVER COMPUTING SYSTEM TO THE PUBLIC CLOUD FOR BACKUP OPERATION 419 the data of OBTAIN THE DATA STORAGE SYSTEM DATA AT A BACKUP SERVER COMPUTING SYSTEM OPERATION 405 is sent to, i.e., backed up to, the public cloud as the ownership based fine-grained encrypted data generated at ENCRYPT DATA BASED ON THE OWNER OF THE DATA USING THE OBTAINED ENCRYPTION KEY(S) ASSOCIATED WITH THE DETERMINED DATA OWNERS OPERATION 417.

In one embodiment, at TRANSFER THE ENCRYPTED DATA FROM THE BACKUP SERVER COMPUTING SYSTEM TO THE PUBLIC CLOUD FOR BACKUP OPERATION 419 the ownership based fine-grained encrypted data generated at ENCRYPT DATA BASED ON THE OWNER OF THE DATA USING THE OBTAINED ENCRYPTION KEY(S) ASSOCIATED WITH THE DETERMINED DATA OWNERS OPERATION 417 is sent to, i.e., backed up to, a public cloud such as the Internet.

In one embodiment, at TRANSFER THE ENCRYPTED DATA FROM THE BACKUP SERVER COMPUTING SYSTEM TO THE PUBLIC CLOUD FOR BACKUP OPERATION 419 the ownership based fine-grained encrypted data generated at ENCRYPT DATA BASED ON THE OWNER OF THE DATA USING THE OBTAINED ENCRYPTION KEY(S) ASSOCIATED WITH THE DETERMINED DATA OWNERS OPERATION 417 is sent to, i.e., backed up to, any public cloud, and/or network, as discussed herein, and/or as known in the art at the time of filing, and/or as developed after the time of filing.

In one embodiment, once the ownership based fine-grained encrypted data of ENCRYPT DATA BASED ON THE OWNER OF THE DATA USING THE OBTAINED ENCRYPTION KEY(S) ASSOCIATED WITH THE DETERMINED DATA OWNERS OPERATION 417 is sent to, i.e., backed up to, the public cloud at TRANSFER THE ENCRYPTED DATA FROM THE BACKUP SERVER COMPUTING SYSTEM TO THE PUBLIC CLOUD FOR BACKUP OPERATION 419, process flow proceeds to EXIT OPERATION 430 where process for ensuring compliance and public clouds using fine-grained encryption based on data ownership 400 is exited to await you data.

Using process for ensuring compliance in public clouds using fine-grained encryption based on data ownership 400, the principle of least privilege necessary to meet the requirements of several compliance regulations is met by establishing data ownership, obtaining the relevant encryption keys based on the data ownership, and encrypting the data using the relevant encryption keys, automatically at a backup server computing system prior to the data being transferred to the public cloud. In this way, the encryption, and the required level of security compliance, can be performed in a manner that is easily verified and is virtually effortless and transparent to the end-user. Consequently using process for ensuring compliance in public clouds using fine-grained encryption based on data ownership 400, enterprises can obtain the benefits of using a public cloud data backup system while still meeting, and maintaining the ability to prove they are meeting, data security compliance regulations, and without placing any significant security-related burden on their employees and/or agents.

In one embodiment, the process for ensuring compliance in public clouds using fine-grained encryption based on data ownership discussed herein is implemented as part of an online document store used to store and share data on behalf of an enterprise, such as Google Docs™, Live Office™, etc.

Figure 5:
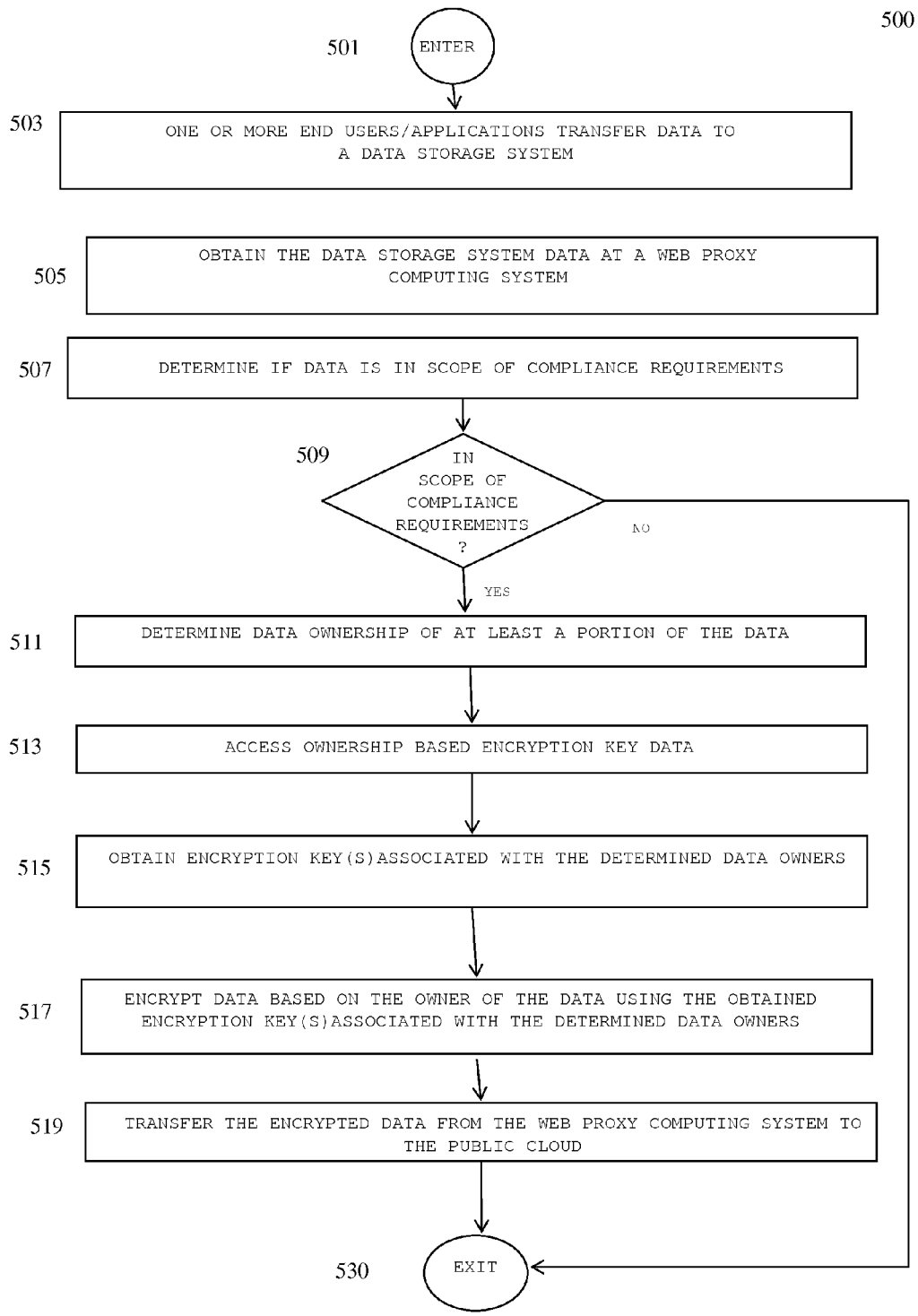
FIG. 5 is a flow chart depicting a process for ensuring compliance in public clouds using fine-grained encryption based on data ownership in accordance with one embodiment.

FIG. 5 is a flowchart depicting a process for ensuring compliance in public clouds using fine-grained encryption based on data ownership 500 in accordance with one embodiment.

Process for ensuring compliance in public clouds using fine-grained encryption based on data ownership 500 begins at ENTER OPERATION 501 and process flow proceeds to ONE OR MORE END USERS/APPLICATIONS TRANSFER DATA TO A DATA STORAGE SYSTEM OPERATION 503.

In one embodiment, at ONE OR MORE END USERS/APPLICATIONS TRANSFER DATA TO A DATA STORAGE SYSTEM OPERATION 503 data is entered, processed, created, and/or otherwise modified or accessed by an end-user and is then saved to a data storage system by one or more end-user computing systems and/or application computing systems.

In one embodiment, at ONE OR MORE END USERS/APPLICATIONS TRANSFER DATA TO A DATA STORAGE SYSTEM OPERATION 503 the end-user that entered, processed, created, and/or otherwise modified or accessed, the data is the "owner" of the data to be saved and or accessed.

In one embodiment, at ONE OR MORE END USERS/APPLICATIONS TRANSFER DATA TO A DATA STORAGE SYSTEM OPERATION 503 the data is saved to a data storage system that can be a data storage device, a designated server system, a designated computing system, or a designated portion of one or more server systems or computing systems, or a distributed database. In one embodiment, the data is saved to a data storage system that can be a dedicated mass storage device implemented in software, hardware, or a combination of hardware and software. In one embodiment, at ONE OR MORE END USERS/APPLICATIONS TRANSFER DATA TO A DATA STORAGE SYSTEM OPERATION 503 the data is saved to a data storage system such as data storage system 120 of FIG. 1. Returning to FIG. 5, in one embodiment, at ONE OR MORE END USERS/APPLICATIONS TRANSFER DATA TO A DATA STORAGE SYSTEM OPERATION 503 the data is saved using any data storage system as discussed herein, and/or as known in the art at the time of filing, and/or as developed after the time of filing.

In one embodiment, once data is entered, processed, created, and/or otherwise modified or accessed, by an end-user and is then saved to a data storage system at ONE OR MORE END USERS/APPLICATIONS TRANSFER DATA TO A DATA STORAGE SYSTEM OPERATION 503, process flow proceeds to OBTAIN THE DATA STORAGE SYSTEM DATA AT A WEB PROXY COMPUTING SYSTEM OPERATION 505.

In one embodiment, at OBTAIN THE DATA STORAGE SYSTEM DATA AT A WEB PROXY COMPUTING SYSTEM OPERATION 505 at least part of the data from ONE OR MORE END USERS/APPLICATIONS TRANSFER DATA TO A DATA STORAGE SYSTEM OPERATION 503 is transferred to a web proxy computing system, or similar gateway computing system, for processing prior to being sent to the public cloud.

In one embodiment, at OBTAIN THE DATA STORAGE SYSTEM DATA AT A WEB PROXY COMPUTING SYSTEM OPERATION 505 the data is sent to a web proxy computing system such as gateway computing system 150 of FIG. 1.

Returning to FIG. 5, in various embodiments, the web proxy computing system of OBTAIN THE DATA STORAGE SYSTEM DATA AT A WEB PROXY COMPUTING SYSTEM OPERATION 505 is a "chokepoint" through which all, or a significant portion of, data passes before being sent to the public cloud, such as any gateway computing system discussed herein, and/or as known in the art at the time of filing, and/or as developed after the time of filing.

In one embodiment, once at least part of the data from ONE OR MORE END USERS/APPLICATIONS TRANSFER DATA TO A DATA STORAGE SYSTEM OPERATION 503 is transferred to a web proxy computing system for processing prior to being sent to, transferred to, and/or accessed from, the public cloud at OBTAIN THE DATA STORAGE SYSTEM DATA AT A WEB PROXY COMPUTING SYSTEM OPERATION 505, process flow proceeds to DETERMINE IF DATA IS IN SCOPE OF COMPLIANCE REQUIREMENTS OPERATION 507.

In one embodiment, at DETERMINE IF DATA IS IN SCOPE OF COMPLIANCE REQUIREMENTS OPERATION 507 the data of ONE OR MORE END USERS/APPLICATIONS TRANSFER DATA TO A DATA STORAGE SYSTEM OPERATION 503 is analyzed to determine the data classification and whether the data is in compliance scope, i.e., is subject to one or more regulatory policies and/or regulations.

As noted above, currently there exist several regulatory policies and/or organizations that are charged with regulating access and use of certain types of "sensitive" data associated with individuals such as payment data, healthcare related data, and various types of other financial and personal data. These regulatory policies and/or organizations include, but are not limited to: the Payment Card Industry Data Security Standard (PCI DSS); the Health Insurance Portability and Accountability Act (HIPAA); and the Sarbanes-Oxley Act, among others. As also noted above, many of these regulatory policies and/or organizations require specific access protocols, technical controls, regular reporting, audit trails, and proof of implementation, related to the accessing and transport of, use of, and processing of, various types of data.

In one embodiment, at DETERMINE IF DATA IS IN SCOPE OF COMPLIANCE REQUIREMENTS OPERATION 507 the data of ONE OR MORE END USERS/APPLICATIONS TRANSFER DATA TO A DATA STORAGE SYSTEM OPERATION 503 is analyzed by one or more processors, such as CPUs 201 of FIG. 2, to determine the data classification and whether the data is in compliance scope, i.e., is subject to one or more regulatory policies and/or regulations.

Those of skill in the art will recognize that, in some embodiments, the analysis of the data of ONE OR MORE END USERS/APPLICATIONS TRANSFER DATA TO A DATA STORAGE SYSTEM OPERATION 503 to determine the data classification and whether the data is in compliance scope of DETERMINE IF DATA IS IN SCOPE OF COMPLIANCE REQUIREMENTS OPERATION 507 can be performed prior to OBTAIN THE DATA STORAGE SYSTEM DATA AT A WEB PROXY COMPUTING SYSTEM OPERATION 505 and before the data from ONE OR MORE END USERS/APPLICATIONS TRANSFER DATA TO A DATA STORAGE SYSTEM OPERATION 503 is transferred to the web proxy computing system. Consequently, the specific order of operations discussed herein is for illustrative purposes only and the particular order and or grouping shown and discussed herein are not limiting. In addition, those of skill in the art will recognize that other orders and/or groupings of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be regrouped as portions of one or more other of the process steps and/or operations and/or instructions discussed herein. Consequently the particular order and or grouping of the process steps and/or operations and/or instructions discussed herein do not limit the scope of the invention as claimed below.

In one embodiment, once the data of ONE OR MORE END USERS/APPLICATIONS TRANSFER DATA TO A DATA STORAGE SYSTEM OPERATION 503 is analyzed to determine the data classification and whether the data is in compliance scope at DETERMINE IF DATA IS IN SCOPE OF COMPLIANCE REQUIREMENTS OPERATION 507 process flow proceeds to IN SCOPE OF COMPLIANCE REQUIREMENTS? OPERATION 509.

In one embodiment, if, at IN SCOPE OF COMPLIANCE REQUIREMENTS? OPERATION 509 the data of DETERMINE IF DATA IS IN SCOPE OF COMPLIANCE REQUIREMENTS OPERATION 507 is determined not to be subject to one or more regulatory policies and/or regulations, i.e., the result is "NO", then the data is sent directly to EXIT OPERATION 530 and, in some embodiments, is transferred to the public cloud without further processing by process for ensuring compliance in public clouds using fine-grained encryption based on data ownership 500.

On the other hand, in one embodiment, if, at IN SCOPE OF COMPLIANCE REQUIREMENTS? OPERATION 509 the data of DETERMINE IF DATA IS IN SCOPE OF COMPLIANCE REQUIREMENTS OPERATION 507 is determined to be subject to one or more regulatory policies and/or regulations, i.e., the result is "YES", then process flow proceeds to DETERMINE DATA OWNERSHIP OF AT LEAST A PORTION OF THE DATA OPERATION 511.

In one embodiment, at DETERMINE DATA OWNERSHIP OF AT LEAST A PORTION OF THE DATA OPERATION 511 the data ownership of at least part of the data of OBTAIN THE DATA STORAGE SYSTEM DATA AT A WEB PROXY COMPUTING SYSTEM OPERATION 505 is determined at the web proxy computing system using a data ownership determination system.

In one embodiment, at DETERMINE DATA OWNERSHIP OF AT LEAST A PORTION OF THE DATA OPERATION 511 the data ownership of at least part of the data of OBTAIN THE DATA STORAGE SYSTEM DATA AT A WEB PROXY COMPUTING SYSTEM OPERATION 505 is determined at the web proxy computing system using a data ownership determination system and under the direction of one or more processors, such as CPUs 201 of FIG. 2.

Returning to FIG. 5, in one embodiment, at DETERMINE DATA OWNERSHIP OF AT LEAST A PORTION OF THE DATA OPERATION 511 the data ownership, i.e., the end-user who entered, processed, created, and/or otherwise modified or accessed, the data at ONE OR MORE END USERS/APPLICATIONS TRANSFER DATA TO A DATA STORAGE SYSTEM OPERATION 503 is determined at the web proxy computing system using a data ownership determination system.

Currently, as noted above, data ownership determination systems use various parameters to determine the ownership of data automatically without having to resort to obtaining input from the data owners themselves at the time the data is saved and/or transferred and/or accessed and/or backed up. Consequently, using some data ownership determination systems, employees and/or agents of the enterprise that own the data are not disturbed as a data ownership determination takes place transparently from the data owners' perspective.

One example of a currently available data ownership determination system is Data Insight Technology™ available from Symantec Corporation of Mountain View, Calif.

In one embodiment, once the data ownership of at least part of the data of OBTAIN THE DATA STORAGE SYSTEM DATA AT A WEB PROXY COMPUTING SYSTEM OPERATION 505 is determined at the web proxy computing system using a data ownership determination system at DETERMINE DATA OWNERSHIP OF AT LEAST A PORTION OF THE DATA OPERATION 511, process flow proceeds to ACCESS OWNERSHIP BASED ENCRYPTION KEY DATA OPERATION 513.

In one embodiment, at ACCESS OWNERSHIP BASED ENCRYPTION KEY DATA OPERATION 513 access to data representing the encryption keys associated with the identified data owners of DETERMINE DATA OWNERSHIP OF AT LEAST A PORTION OF THE DATA OPERATION 511 is obtained.

In various embodiments, at ACCESS OWNERSHIP BASED ENCRYPTION KEY DATA OPERATION 513 access to data representing the encryption keys associated with the identified data owners is obtained by gaining access to an enterprise encryption key management server system implemented by the enterprise.

In various embodiments, at ACCESS OWNERSHIP BASED ENCRYPTION KEY DATA OPERATION 513 access to data representing the encryption keys associated with the identified data owners is obtained by gaining access to any source of encryption key data as discussed herein, and/or as known in the art at the time of filing, and/or as developed after the time of filing.

In one embodiment, at ACCESS OWNERSHIP BASED ENCRYPTION KEY DATA OPERATION 513 access to data representing the encryption keys associated with the identified data owners is obtained under the direction of one or more processors, such as CPUs 201 of FIG. 2.

Returning to FIG. 5, in one embodiment, once access to data representing the encryption keys associated with the identified data owners of DETERMINE DATA OWNERSHIP OF AT LEAST A PORTION OF THE DATA OPERATION 511 is obtained at ACCESS OWNERSHIP BASED ENCRYPTION KEY DATA OPERATION 513 process flow proceeds to OBTAIN ENCRYPTION KEY(S) ASSOCIATED WITH THE DETERMINED DATA OWNERS OPERATION 515.

In one embodiment, at OBTAIN ENCRYPTION KEY(S) ASSOCIATED WITH THE DETERMINED DATA OWNERS OPERATION 515 once the data ownership is determined at DETERMINE DATA OWNERSHIP OF AT LEAST A PORTION OF THE DATA OPERATION 511 and access to the ownership based encryption key data is obtained at ACCESS OWNERSHIP BASED ENCRYPTION KEY DATA OPERATION 513, the encryption keys associated with the identified data owners are obtained.

In one embodiment, at OBTAIN ENCRYPTION KEY(S) ASSOCIATED WITH THE DETERMINED DATA OWNERS OPERATION 515 data representing the encryption keys associated with the identified data owners is obtained from an enterprise encryption key management server system implemented by the enterprise.

In various embodiments, at OBTAIN ENCRYPTION KEY(S) ASSOCIATED WITH THE DETERMINED DATA OWNERS OPERATION 515 data representing the encryption keys associated with the identified data owners is obtained from any source of encryption key data as discussed herein, and/or as known in the art at the time of filing, and/or as developed after the time of filing.

In one embodiment, at ACCESS OWNERSHIP BASED ENCRYPTION KEY DATA OPERATION 513 data representing the encryption keys associated with the identified data owners is obtained under the direction of one or more processors, such as CPUs 201 of FIG. 2.

Returning to FIG. 5, once the data ownership is determined at DETERMINE DATA OWNERSHIP OF AT LEAST A PORTION OF THE DATA OPERATION 511 and the encryption keys associated with the identified data owners are obtained at OBTAIN ENCRYPTION KEY(S) ASSOCIATED WITH THE DETERMINED DATA OWNERS OPERATION 515, process flow proceeds to ENCRYPT DATA BASED ON THE OWNER OF THE DATA USING THE OBTAINED ENCRYPTION KEY(S) ASSOCIATED WITH THE DETERMINED DATA OWNERS OPERATION 517.

In one embodiment, at ENCRYPT DATA BASED ON THE OWNER OF THE DATA USING THE OBTAINED ENCRYPTION KEY(S) ASSOCIATED WITH THE DETERMINED DATA OWNERS OPERATION 517 the data of OBTAIN THE DATA STORAGE SYSTEM DATA AT A WEB PROXY COMPUTING SYSTEM OPERATION 505 is encrypted using the respective encryption keys associated with the data owners of OBTAIN ENCRYPTION KEY(S) ASSOCIATED WITH THE DETERMINED DATA OWNERS OPERATION 515.

In one embodiment, at ENCRYPT DATA BASED ON THE OWNER OF THE DATA USING THE OBTAINED ENCRYPTION KEY(S) ASSOCIATED WITH THE DETERMINED DATA OWNERS OPERATION 517 the data of OBTAIN THE DATA STORAGE SYSTEM DATA AT A WEB PROXY COMPUTING SYSTEM OPERATION 505 is encrypted using the respective encryption keys associated with the data owners of OBTAIN ENCRYPTION KEY(S) ASSOCIATED WITH THE DETERMINED DATA OWNERS OPERATION 515 under the direction of one or more processors, such as CPUs 201 of FIG. 2.

Returning to FIG. 5, in one embodiment, once the data of OBTAIN THE DATA STORAGE SYSTEM DATA AT A WEB PROXY COMPUTING SYSTEM OPERATION 505 is encrypted using the respective encryption keys associated with the data owners of OBTAIN ENCRYPTION KEY(S) ASSOCIATED WITH THE DETERMINED DATA OWNERS OPERATION 515 at ENCRYPT DATA BASED ON THE OWNER OF THE DATA USING THE OBTAINED ENCRYPTION KEY(S) ASSOCIATED WITH THE DETERMINED DATA OWNERS OPERATION 517, process flow proceeds to TRANSFER THE ENCRYPTED DATA FROM THE WEB PROXY COMPUTING SYSTEM TO THE PUBLIC CLOUD OPERATION 519.

In one embodiment, at TRANSFER THE ENCRYPTED DATA FROM THE WEB PROXY COMPUTING SYSTEM TO THE PUBLIC CLOUD OPERATION 519 the data of OBTAIN THE DATA STORAGE SYSTEM DATA AT A WEB PROXY COMPUTING SYSTEM OPERATION 505 is sent to, transferred to, and/or accessed from, the public cloud as the ownership based fine-grained encrypted data generated at ENCRYPT DATA BASED ON THE OWNER OF THE DATA USING THE OBTAINED ENCRYPTION KEY(S) ASSOCIATED WITH THE DETERMINED DATA OWNERS OPERATION 517.

In one embodiment, at TRANSFER THE ENCRYPTED DATA FROM THE WEB PROXY COMPUTING SYSTEM TO THE PUBLIC CLOUD OPERATION 519 the ownership based fine-grained encrypted data generated at ENCRYPT DATA BASED ON THE OWNER OF THE DATA USING THE OBTAINED ENCRYPTION KEY(S) ASSOCIATED WITH THE DETERMINED DATA OWNERS OPERATION 517 is sent to, transferred to, and/or accessed from, a public cloud such as the Internet.

In one embodiment, at TRANSFER THE ENCRYPTED DATA FROM THE WEB PROXY COMPUTING SYSTEM TO THE PUBLIC CLOUD OPERATION 519 the ownership based fine-grained encrypted data generated at ENCRYPT DATA BASED ON THE OWNER OF THE DATA USING THE OBTAINED ENCRYPTION KEY(S) ASSOCIATED WITH THE DETERMINED DATA OWNERS OPERATION 517 is sent to, transferred to, and/or accessed from, any public cloud, and/or network, as discussed herein, and/or as known in the art at the time of filing, and/or as developed after the time of filing.

In one embodiment, once the ownership based fine-grained encrypted data of ENCRYPT DATA BASED ON THE OWNER OF THE DATA USING THE OBTAINED ENCRYPTION KEY(S) ASSOCIATED WITH THE DETERMINED DATA OWNERS OPERATION 517 is sent to, i.e., backed up to, the public cloud at TRANSFER THE ENCRYPTED DATA FROM THE WEB PROXY COMPUTING SYSTEM TO THE PUBLIC CLOUD OPERATION 519, process flow proceeds to EXIT OPERATION 530 where process for ensuring compliance and public clouds using fine-grained encryption based on data ownership 500 is exited to await you data.

Using process for ensuring compliance in public clouds using fine-grained encryption based on data ownership 500, the principle of least privilege necessary to meet the requirements of several compliance regulations is met by establishing data ownership, obtaining the relevant encryption keys based on the data ownership, and encrypting the data using the relevant encryption keys, automatically at a web proxy computing system prior to the data being transferred to the public cloud. In this way, the encryption, and the required level of security compliance, can be performed in a manner that is easily verified and is virtually effortless and transparent to the end-user. Consequently using process for ensuring compliance in public clouds using fine-grained encryption based on data ownership 500, enterprises can obtain the benefits of using a public cloud-based document store system while still meeting, and maintaining the ability to prove they are meeting, data security compliance regulations, and without placing any significant security-related burden on their employees and/or agents.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

Herein, embodiments have been discussed with reference to the accompanying FIG.s, which depict one or more exemplary embodiments. The above description includes reference to specific embodiments for illustrative purposes. However, the illustrative discussion above is not intended to be exhaustive or to limit the invention to the precise forms disclosed. Many modifications and variations are possible in view of the teachings below. The embodiments discussed above were chosen and described in order to explain the principles of the invention, and its practical applications, to thereby enable others skilled in the art to utilize the invention and various embodiments with various modifications as may be suited to the particular use contemplated. Therefore, embodiments may be embodied in many different forms than those shown and discussed herein and should not be construed as limited to the embodiments set forth herein, shown in the FIG.s, and/or described below. In addition, the nomenclature used for components, capitalization of component designations and terms, the attributes, data structures, or any other programming or structural aspect is not significant, mandatory, or limiting, and the mechanisms that implement the invention or its features can have various different names, formats, and/or protocols. Further, the system and/or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic and/or algorithm-like descriptions and representations are the means used by those of skill in the art to most effectively and efficiently convey the substance of their work to others of skill in the art. These operations, while described functionally or logically, are understood to be implemented by computer programs and/or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as "analyzing", "accessing", "calculating", "capturing", "classifying", "comparing", "defining", "detecting", "determining", "distributing", "encrypting", "extracting", "filtering", "generating", "monitoring", "obtaining", "processing", "providing", "receiving", "requesting", "saving", "sending", "storing", "transferring", "transforming", "using", etc., refer to the action and processes of a computing system or similar electronic device that manipulates and operates on data represented as physical (electronic) quantities within the computing system memories, resisters, caches or other information storage, transmission or display devices.

Certain aspects of the present invention include process steps or operations and instructions described herein in an algorithmic and/or algorithmic-like form. It should be noted that the process steps and/or operations and instructions of the present invention can be embodied in software, firmware, and/or hardware, and when embodied in software, can be downloaded to reside on and be operated from different platforms used by real time network operating systems.

The present invention also relates to an apparatus or system for performing the operations described herein. This apparatus or system may be specifically constructed for the required purposes, or the apparatus or system can comprise a general purpose system selectively activated or by a computer program stored on a computer program product as defined herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicably coupled to similar and/or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A computing system implemented process for ensuring compliance in public clouds using fine-grained encryption based on data ownership comprising:
    a private network having at least two parties generating data wherein the at least two parties are generating their particular generated data on behalf of a first entity;
    receiving, at a gateway computing system, first and second generated data from respective ones of the two or more parties at a gateway computing system, the gateway computing system being coupled between the private network and a public network, the public network being accessible by the private network only through the gateway computing system;
    analyzing, using one or more processors, the first and second generated data and determining whether either or both of the first and second generated data is within the scope of one or more regulatory policies, the analysis resulting in a first determination that the first generated data is within the scope of one or more regulatory policies, and a second determination that the second generated data is not within the scope of one of more regulatory policies;

transferring the second generated data to the public cloud without further processing; and
using one or more processors to:
determine, at the gateway computing system before the first generated data is transferred to the public network, using a data ownership determination system, the ownership of the first generated data to be a first entity;
access ownership based encryption key data associated with the determined owner of the first generated data;
obtain, at the gateway computing system before the first generated data is transferred to the public network, data representing the encryption keys associated with the determined owner of the first generated data at the gateway computing system;
encrypt, at the gateway computing system before the first data is transferred to the public network, the generated data in accordance with the encryption keys associated with the determined owner of the first data, thereby transforming the data into ownership based fine-grained encrypted data; and
transfer the ownership based fine-grained encrypted data from the gateway computing system to the public cloud.

2. The computing system implemented process for ensuring compliance in public clouds using fine-grained encryption based on data ownership of claim 1, wherein:
the gateway computing system is a backup server computing system.

3. The computing system implemented process for ensuring compliance in public clouds using fine-grained encryption based on data ownership of claim 1, wherein:
the gateway computing system is a web portal computing system.

4. The computing system implemented process for ensuring compliance in public clouds using fine-grained encryption based on data ownership of claim 1, wherein:
at least one of the one or more regulatory policies is selected from the group of regulatory policies consisting of:
the Payment Card Industry Data Security Standard (PCI DSS);
the Health Insurance Portability and Accountability Act (HIPAA); and
the Sarbanes-Oxley Act.

5. The computing system implemented process for ensuring compliance in public clouds using fine-grained encryption based on data ownership of claim 1, wherein:
the ownership based encryption key data is obtained from an enterprise encryption key server system.

6. The computing system implemented process for ensuring compliance in public clouds using fine-grained encryption based on data ownership of claim 1, wherein:
the public cloud is the Internet.

7. A method for ensuring compliance in public clouds using fine-grained encryption based on data ownership comprising:
receiving, at a gateway computing system, first and second generated data from respective ones of two or more users, the gateway computing system being disposed between a private network having two or more computing systems operated by respective ones of the two or more users and a public network having one or more computing systems wherein the two or more users are generating their respective generated data on behalf of a first entity;
analyzing the first and second generated data and determining whether either or both of the first and second generated data is within the scope of one or more regulatory policies, the analysis resulting in a first determination that the first generated data is within the scope of one or more regulatory policies, and a second determination that the second generated data is not within the scope of one of more regulatory policies;
transferring the second generated data to the public cloud without further processing;
determining, at the gateway computing system before the first generated data is transferred to the public network, using a data ownership determination system, the ownership of the first generated data to be the first entity;
accessing ownership based encryption key data associated with the determined owner of the first generated data;
obtaining, at the gateway computing system before the first generated data is transferred to the public network, data representing the encryption keys associated with the determined owner of the generated data at the gateway computing system;
encrypting, at the gateway computing system before the first generated data is transferred to the public network, the first generated data in accordance with the encryption keys associated with the determined owner of the first generated data, thereby transforming the first generated data into ownership based fine-grained encrypted data; and
transferring the ownership based fine-grained encrypted data from the gateway computing system to the public cloud.

8. The method for ensuring compliance in public clouds using fine-grained encryption based on data ownership of claim 7, wherein:
the gateway computing system is a backup server computing system.

9. The method for ensuring compliance in public clouds using fine-grained encryption based on data ownership of claim 7, wherein:
the gateway computing system is a web portal computing system.

10. The method for ensuring compliance in public clouds using fine-grained encryption based on data ownership of claim 7, wherein:
at least one of the one or more regulatory policies is selected from the group of regulatory policies consisting of:
the Payment Card Industry Data Security Standard (PCI DSS);
the Health Insurance Portability and Accountability Act (HIPAA); and
the Sarbanes-Oxley Act.

11. The method for ensuring compliance in public clouds using fine-grained encryption based on data ownership of claim 7, wherein:
the ownership based encryption key data is obtained from an enterprise encryption key server system.

12. The method for ensuring compliance in public clouds using fine-grained encryption based on data ownership of claim 7, wherein:
the public cloud is the Internet.

13. A system for ensuring compliance in public clouds using fine-grained encryption based on data ownership comprising:

two or more user/application computing systems, each respective user/application computing system being under the control of individual ones of two or more parties;

a gateway computing system;

data representing one or more data security system requirements;

a data ownership determination system;

an encryption key server computing system, the encryption key server computing system including ownership based encryption key data associated with one or more owners of data associated with the two or more user/application computing systems;

a public cloud; and at least one processor associated with the gateway computing system, the at least one processor associated with the gateway computing system executing at least part of a process for ensuring compliance in public clouds using fine-grained encryption based on data ownership, the process comprising:

receiving, first and second generated data from respective ones of the two or more user/application computing systems, at the gateway computing system, the gateway computing system being coupled between the private network and the public cloud, the public cloud being accessible by the private network only through the gateway computing system wherein at least two parties are generating respective first and second generated data on behalf of a first entity;

analyzing the first and second generated data and the data representing one or more data security system requirements to determine and determining that the generated data is within the scope of the one or more regulatory policies, the analysis resulting in a first determination that the first generated data is within the scope of one or more regulatory policies, and a second determination that the second generated data is not within the scope of one of more regulatory policies;

transferring the second generated data to the public cloud without further processing;

determining, at the gateway computing system, the ownership of the first generated data to be a first entity, before the first generated data is transferred to the public cloud;

accessing the encryption key server computing system and the ownership based encryption key data associated with the determined owner of the first generated data;

obtaining, at the gateway computing system before the first generated data is transferred to the public cloud, data representing the encryption keys associated with the determined owner of the first generated data from the encryption key server computing system;

encrypting, at the gateway computing system before the data is transferred to the public cloud, the first generated data in accordance with the encryption keys associated with the determined owners of the first generated data, thereby transforming the first generated data into ownership based fine-grained encrypted data; and transferring the ownership based fine-grained encrypted data from the gateway computing system to the public cloud.

14. The system for ensuring compliance in public clouds using fine-grained encryption based on data ownership of claim 13, wherein:

the gateway computing system is a backup server computing system.

15. The system for ensuring compliance in public clouds using fine-grained encryption based on data ownership of claim 13, wherein:

the gateway computing system is a web portal computing system.

16. The system for ensuring compliance in public clouds using fine-grained encryption based on data ownership of claim 13, wherein:

at least one of the one or more regulatory policies is selected from the group of regulatory policies consisting of:

the Payment Card Industry Data Security Standard (PCI DSS);

the Health Insurance Portability and Accountability Act (HIPAA); and the Sarbanes-Oxley Act.

17. The system for ensuring compliance in public clouds using fine-grained encryption based on data ownership of claim 13, wherein:

the public cloud is the Internet.

* * * * *